(12) United States Patent
Shin et al.

(10) Patent No.: US 6,854,856 B2
(45) Date of Patent: Feb. 15, 2005

(54) BACKLIGHT ASSEMBLY AND LIQUID CRYSTAL DISPLAY APPARATUS HAVING THE SAME

(75) Inventors: Jin-Soo Shin, Gyeonggi-do (KR); Young-Jae Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/336,115

(22) Filed: Jan. 3, 2003

(65) Prior Publication Data

US 2003/0223215 A1 Dec. 4, 2003

(30) Foreign Application Priority Data

May 29, 2002 (KR) .......................................... 2002-29846

(51) Int. Cl.[7] ................................................. F21V 7/04
(52) U.S. Cl. ........................... 362/31; 362/225; 362/26; 349/58; 349/65
(58) Field of Search ........................... 362/31, 26, 235, 362/225; 349/65, 58, 70

(56) References Cited

U.S. PATENT DOCUMENTS 6,108,060 A * 8/2000 Funamoto et al. ............ 349/65
6,308,444 B1 * 10/2001 Ki .................................. 40/546
6,667,780 B2 * 12/2003 Cho ............................. 349/58

* cited by examiner

Primary Examiner—Thomas M. Sember
(74) Attorney, Agent, or Firm—Cantor Colburn LLP

(57) ABSTRACT

An LCD apparatus has a first lamp unit, a light guide unit, and a receiving container. The first lamp unit has a first light generating portion and a second light generating portion integrally connected with the first light generating portion. The light guide unit has side surfaces for receiving light from the first lamp unit, a reflecting surface for reflecting the light input through the side surfaces, and an emitting surface for emitting the light input through the side surfaces and reflected from the reflecting surface. The receiving container has a bottom and sidewalls each extended from the bottom and facing corresponding one of the side surfaces of the light guide unit, for receiving the first lamp unit and light guide unit. Further the receiving container is configured to have a plurality of parts separate from each other to withdraw the first lamp unit from the receiving container.

27 Claims, 28 Drawing Sheets

BACKLIGHT ASSEMBLY AND LIQUID CRYSTAL DISPLAY APPARATUS HAVING THE SAME

BACKGROUND OF THE INVENTION

1. Field of the Invention

The present invention relates to a backlight assembly and an LCD (Liquid Crystal Display) apparatus, and more particularly to a backlight assembly assembled with multiple parts separable from each other to easily replace components thereof and an LCD apparatus having the same.

2. Description of the Related Art

Information-processing devices have been rapidly developed to provide and facilitate various architectures, functions and information processing speed. Information is processed in such an information-processing device in the form of electrical signals. Thus, to visually display the information processed in an information-processing device, a display device is necessary to serve as an interface means between electrical signals and images to be displayed on the display device.

There have been developments in liquid crystal display devices, which are generally lighter and smaller than CRT type display devices. The liquid crystal display devices have been developed to have advanced functions such as full color and high resolution. As a result, the liquid crystal display devices are widely used for computer monitors, television sets, etc.

FIG. 1 is an exploded perspective view showing a structure of a conventional LCD apparatus.

Referring to FIG. 1, an LCD apparatus 40 includes a mold frame 10, a first lamp unit 16 and a second lamp unit 18 for generating light, a first lamp cover 12 and a second lamp cover 14 for reflecting the light from the first and second lamp units 16 and 18, a light guide plate 22 for guiding the light, a reflecting plate 20 for reflecting the light leaked from the light guide plate 22, one or more optical sheets 26 for controlling brightness of the light emitted from the light guide plate 22, a display unit 28 for displaying images in response to the light supplied from the optical sheet 26, and a top chassis 30 for fixing the display unit 28 to the mold frame 10.

The mold frame 10 provides a space for receiving the above-mentioned components. The first and second lamp units 16 and 18 are received at two end portions, respectively, of the receiving space. Each of the first and second lamp units 16 and 18 has a plurality of lamps. The first and second lamp units 16 and 18 are covered by the first and second lamp covers 12 and 14 to reflect light from the first and second lamp units 16 and 18, respectively. The reflecting plate 20, light guide plate 22, optical sheets 26 and display unit 28 are sequentially received in the receiving space of the mold frame 10. The top chassis 30 has a bottom surface, which is open to expose an effective display area of the display unit 28. The top chassis 30 is combined to the mold frame 10 to fix the display unit 28 to the mold frame 10.

In the LCD apparatus 40, the amount of light needed to display an image on the display unit 28 increases according as a size of the display unit 28 becomes larger. That is, in order to uniformly maintain the brightness distribution of the light supplied from the first and second lamp units 16 and 18 to the display unit 28 through the light guide plate, the amount of the light has to be increased in proportion to the increase of the size of the display unit 28. Accordingly, the conventional LCD apparatus 40 employs a plurality of lamps as shown in FIG. 1.

However, when the number of lamps of the first and second lamp units 16 and 18 increases so as to obtain the amount of the light appropriate to display images, a thickness of the LCD apparatus 40 becomes thicker.

Further, since the multiple lamps are disposed adjacent to the opposite side surfaces of the light guide plate 22, the heat emitted from the multiple lamps is concentrated on the side surfaces. As a result, circuit parts of the display unit 28 adjacent to the first and second lamp units 16 and 18 may be damaged.

BRIEF SUMMARY OF THE INVENTION

The present invention provides a backlight assembly generating light and having readily replaceable components.

The present invention also provides an LCD apparatus having the backlight assembly.

In one aspect of the invention, there is provided a backlight assembly comprising: a first lamp unit for generating light, the first lamp unit having a first light generating portion and a second light generating portion integrally connected with the first light generating portion; a light guide unit for guiding the light, the light guide unit having side surfaces for receiving the light, a reflecting surface for reflecting the light input through the side surfaces, and an emitting surface for emitting the light input through the side surfaces and reflected from the reflecting surface; and a receiving container for receiving the first lamp unit and the light guide unit, the receiving container having a bottom and sidewalls each extended from the bottom and facing corresponding one of the side surfaces of the light guide unit, wherein the receiving container is configured to have a plurality of parts separable from each other to withdraw the first lamp unit from the receiving container.

In another aspect, there is provided an LCD apparatus comprising: a first lamp unit for generating light, the first lamp unit having a first light generating portion and a second light generating portion integrally connected with the first light generating portion; a light guide unit for guiding the light, the light guide unit having side surfaces for receiving the light, a reflecting surface for reflecting the light input through the side surfaces, and an emitting surface for emitting the light input through the side surfaces and reflected from the reflecting surface; a first receiving container for receiving the first lamp unit and the light guide unit, the receiving container having a bottom, sidewalls each extended from the bottom and facing corresponding one of the side surfaces of the light guide unit, and upper surfaces each extended from corresponding one of the sidewalls and facing the bottom, wherein the first receiving container is configured to have a plurality of parts separable from each other to withdraw the first lamp unit from the first receiving container; an LCD panel for receiving the light from the light guide unit and displaying an image, the LCD panel being disposed on the emitting surface of the light guide unit; and a second receiving container for guiding a receiving position of the LCD panel, the second receiving container being combined to the first receiving container.

According to the backlight assembly and LCD apparatus of the present invention, a mold frame for receiving the lamp unit, light guide unit, optical sheet and reflecting plate is configured to have a plurality of parts separable from each other to readily withdraw the lamp unit from the LCD apparatus.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
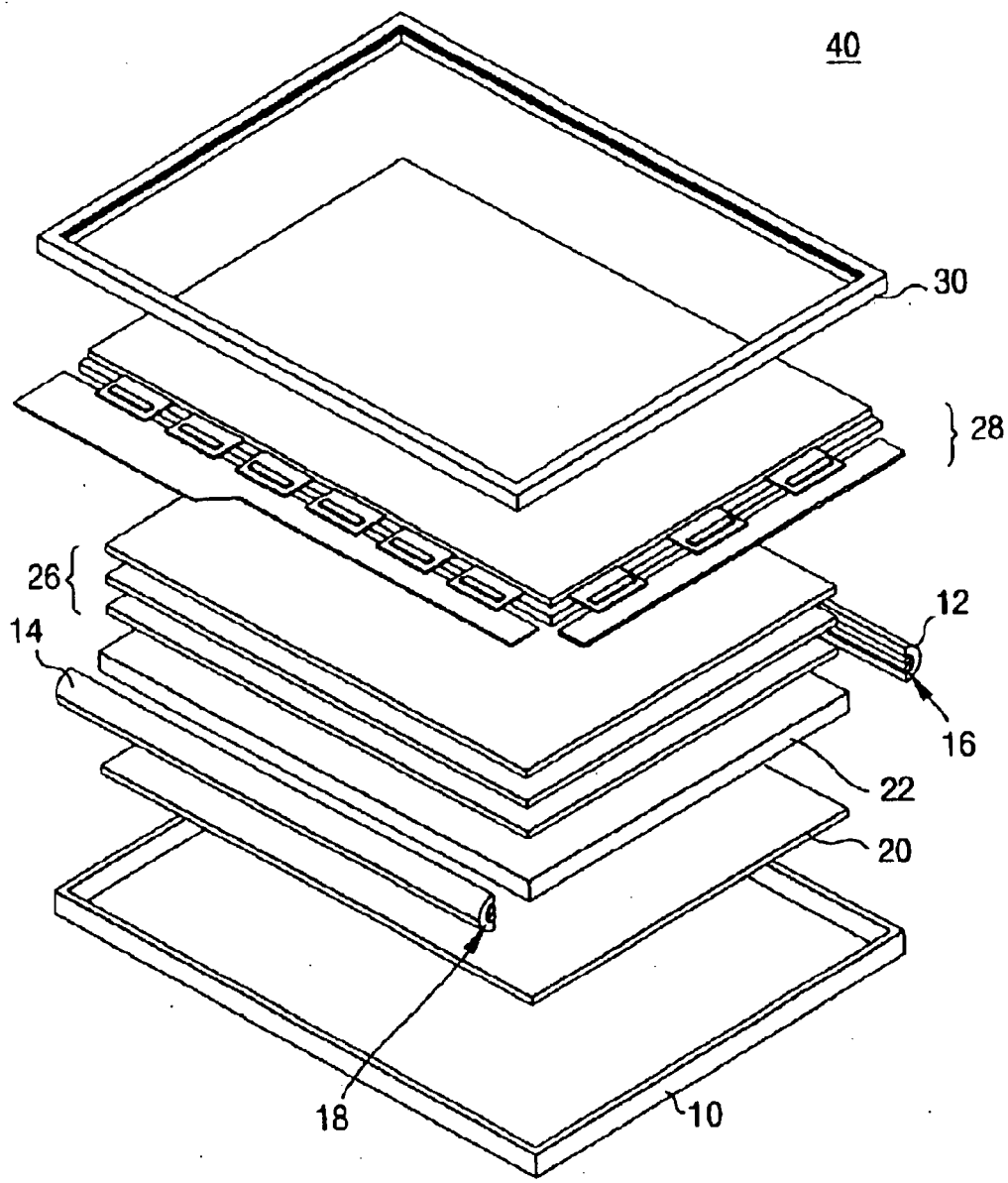
FIG. 1 is an exploded perspective view showing a structure of a conventional LCD apparatus.
Figure 2:
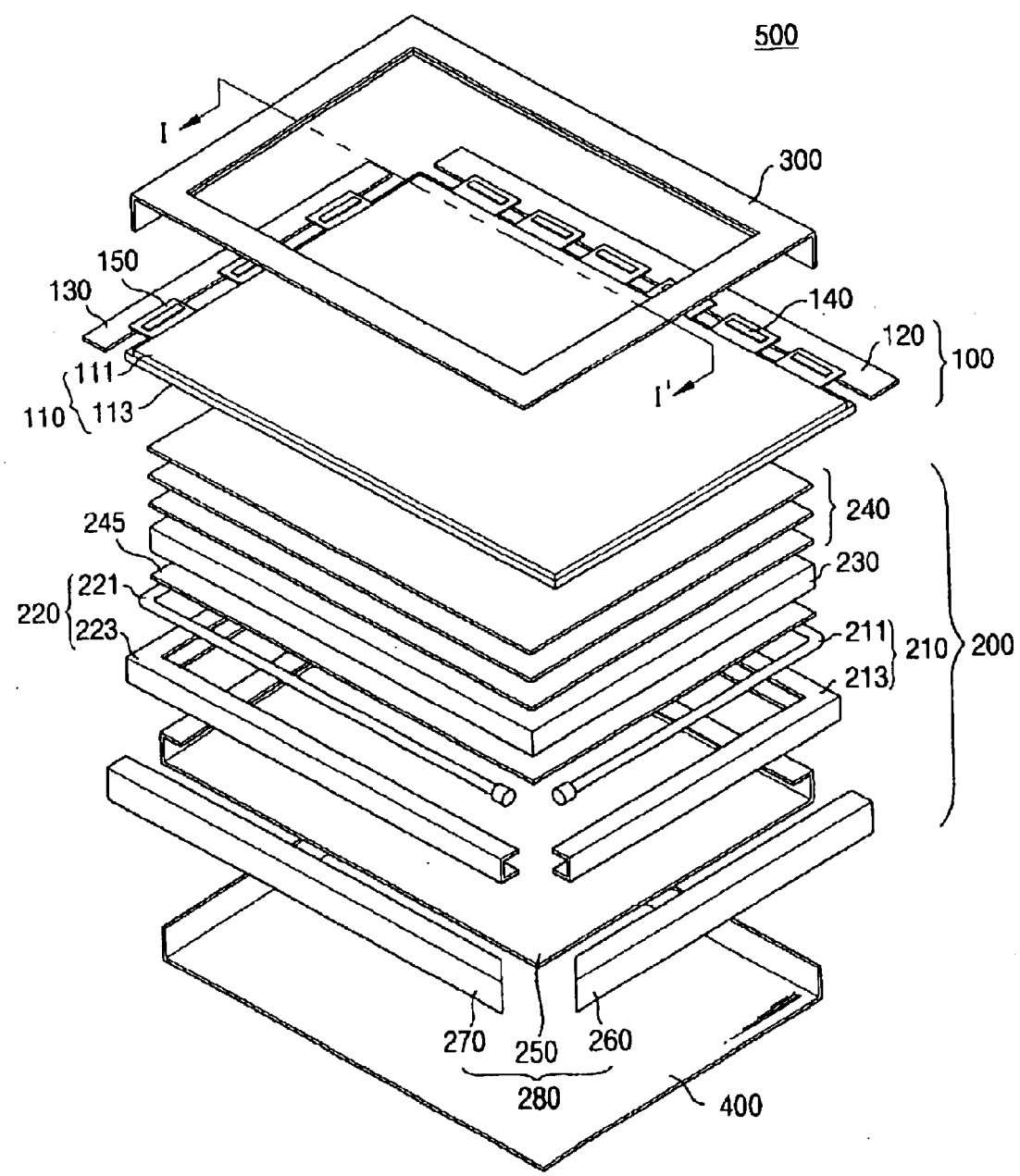
FIG. 2 is an exploded perspective view showing an LCD apparatus according to the present invention.
Figure 3:
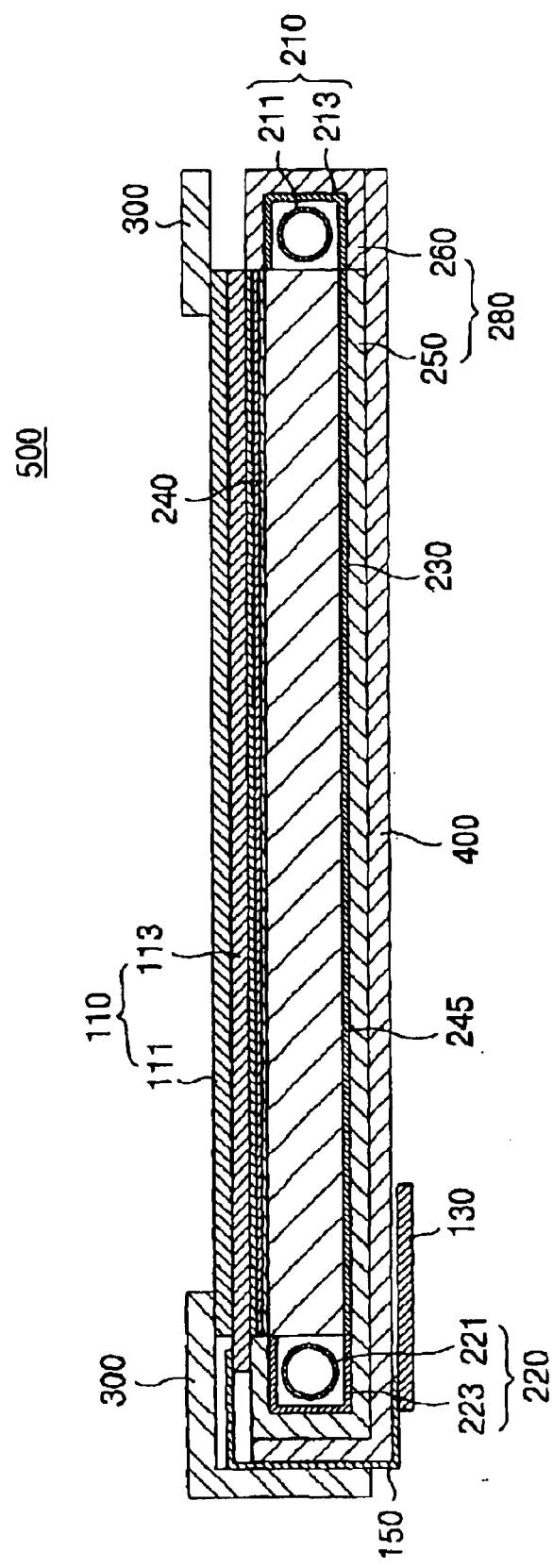
FIG. 3 is a cross-sectional view showing a structure of the LCD apparatus shown in FIG. 2.

FIG. 2 is an exploded perspective view showing an LCD apparatus according to an embodiment of the present invention. FIG. 3 is a cross-sectional view showing a structure of the LCD apparatus shown in FIG. 2.

Referring to FIGS. 2, and 3, an LCD apparatus 500 includes a display unit 100 for receiving image information and displaying images and a backlight assembly 200 for supplying light to the display unit 100.

The display unit 100 includes an LCD panel 110, a data PCB (Printed Circuit Board) 120, a gate PCB 130, a data TCP (Tape Carrier Package) 140 and a gate TCP 150. The LCD panel 110 includes a TFT (Thin Film Transistor) substrate 113, a color filter substrate 111 and liquid crystal (not shown).

The TFT substrate 113 is a transparent glass substrate on which TFTs (not shown) are disposed in a matrix configuration. Each of the TFTs includes a source terminal connected to a data line, a gate terminal connected to a gate line and a drain terminal having a pixel electrode made of ITO (Indium Tin Oxide), which is transparent conductive material. When an electric signal is applied to the data and gate lines, the source and gate terminals of each of the TFTs receive the electric signal through the data and gate lines. Responding to the electric signal, the TFTs are turned on or turned off, so that the drain terminal receives the electric signal needed to control a pixel.

The color filter substrate 111 is disposed facing the TFT substrate 113. RGB pixels, which are color pixels for emitting predetermined colors when the light passes therethrough, are formed on the color filter substrate 111 through a thin film process. A common electrode made of ITO is disposed on the entire surface of the color filter substrate 111.

When a power is applied to the gate and source terminals of selected TFTs disposed on the TFT substrate 113, the selected TFTs are turned on so that an electric field is formed between the pixel electrodes of the selected TFTs and the common electrode of the color filter substrate 111. The electric field varies an aligning angle of the liquid crystal interposed between the TFT substrate 113 and the color filter substrate 111. Accordingly, light transmittance of the liquid crystal varies according to the variation of the aligning angle of the liquid crystal, so that desired images may be obtained on the display unit 100.

As shown in FIG. 2, the data TCP 140 is connected to the data line of the LCD panel 110 to control the timing of a data driving signal, and the gate TCP 150 is connected to the gate line of the LCD panel 110 to control the timing of a gate driving signal. The data PCB 120 for receiving an image signal externally provided and applying the data driving signal to the data line is connected to the data TCP 140, and the gate PCB 130 for applying the gate driving signal to the gate line is connected to the gate TCP 150.

Although it is shown in FIG. 2 that the data PCB 120 is separately disposed from the gate PCB 130 in the LCD apparatus 500, the data PCB and the gate PCB may be disposed in the LCD apparatus 500 as an integrated PCB (not shown).

The backlight assembly 200 includes a first lamp unit 210 and a second lamp unit 220 for generating the light, a light guide plate 230 for guiding the light to the display unit 100, one or more optical sheets 240 for controlling a visual angle of the light from the light guide plate 230, and a reflecting plate 245 for reflecting the light leaked from the light guide plate 230. The optical sheets 240 are disposed on the light guide plate 230, and the reflecting plate 245 is disposed under the light guide plate 230. The light guide plate 230, first lamp unit 210, second lamp unit 220, optical sheets 240 and reflecting plate 245 are received in a mold frame 280.

The mold frame 280 is received in a bottom chassis 400 with the light guide plate 230, first lamp unit 210, second lamp unit 220, optical sheets 240 and reflecting plate 245. The display unit 100 is disposed on the optical sheets 240 and fixed to the bottom chassis 400 by combining a top chassis 300 to the bottom chassis 400.

Figure 4:
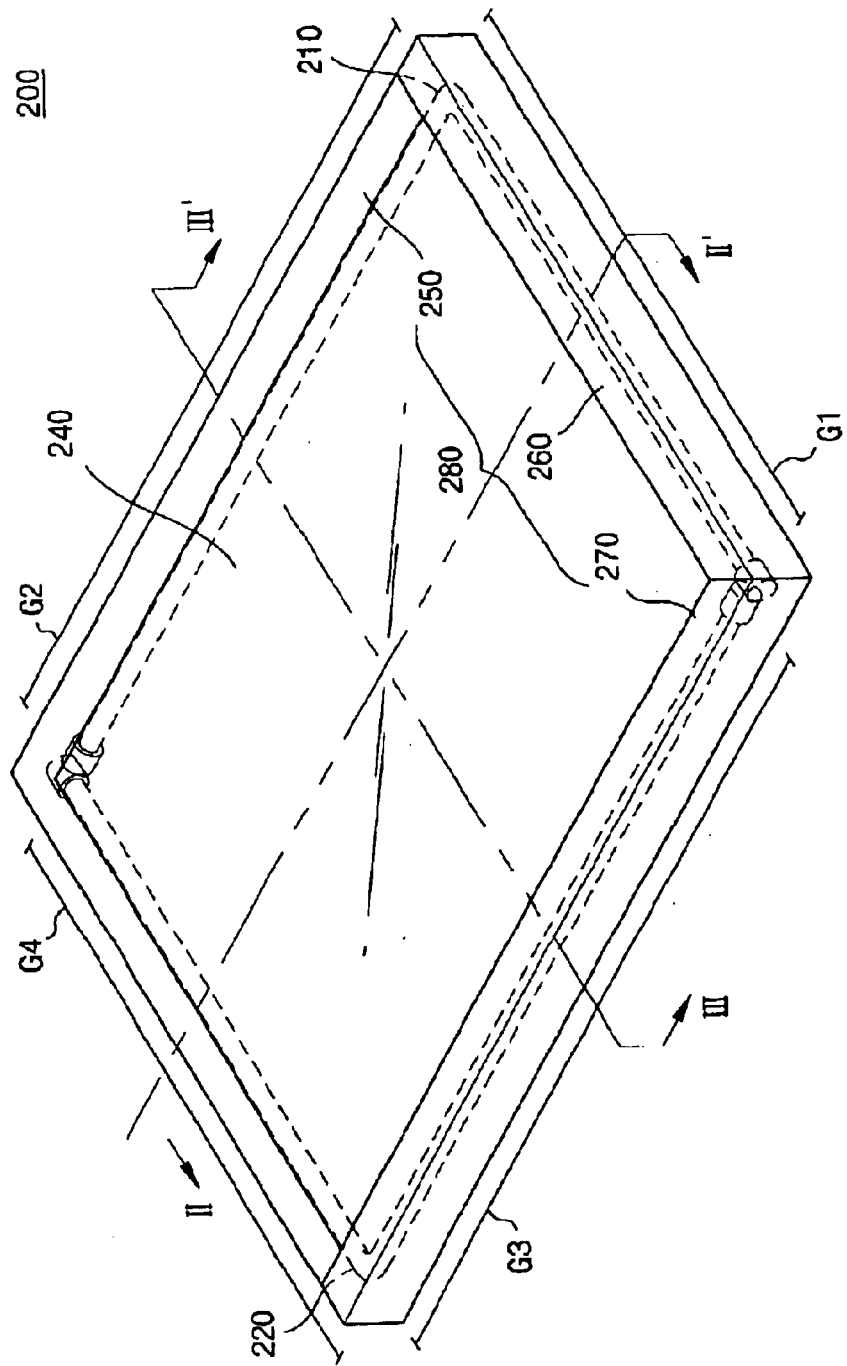
FIG. 4 is a perspective view showing a combination structure of the backlight assembly shown in FIG. 2.
Figure 5:
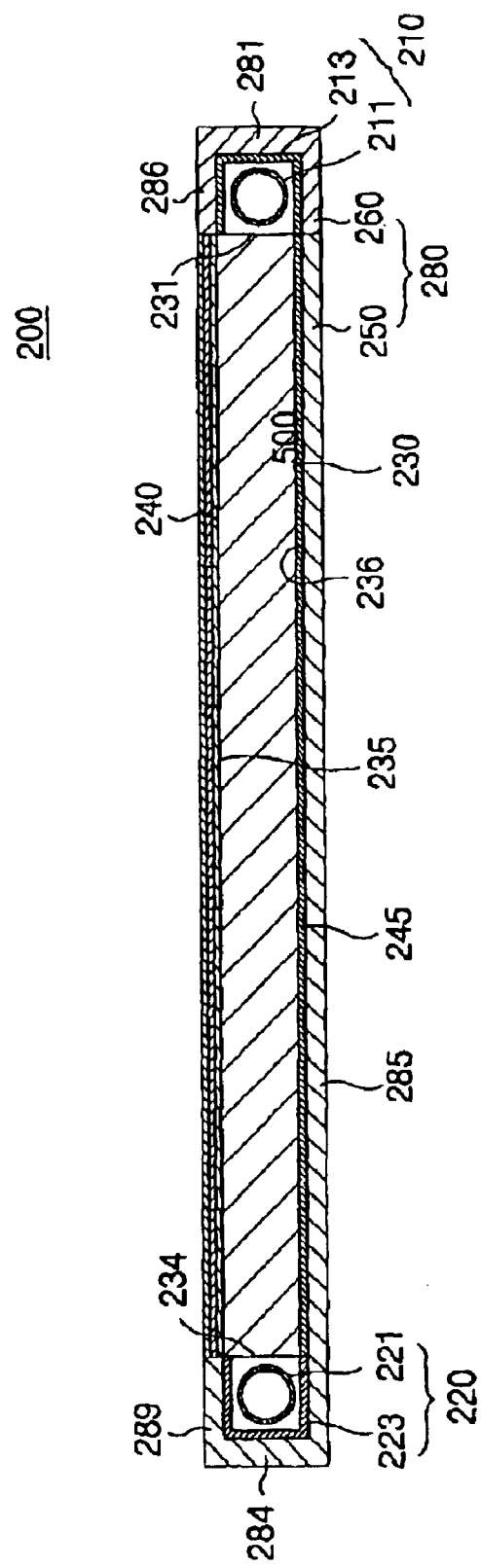
FIG. 5 is a cross-sectional view taken along the line II–II' of the backlight assembly shown in FIG. 4.
Figure 6:
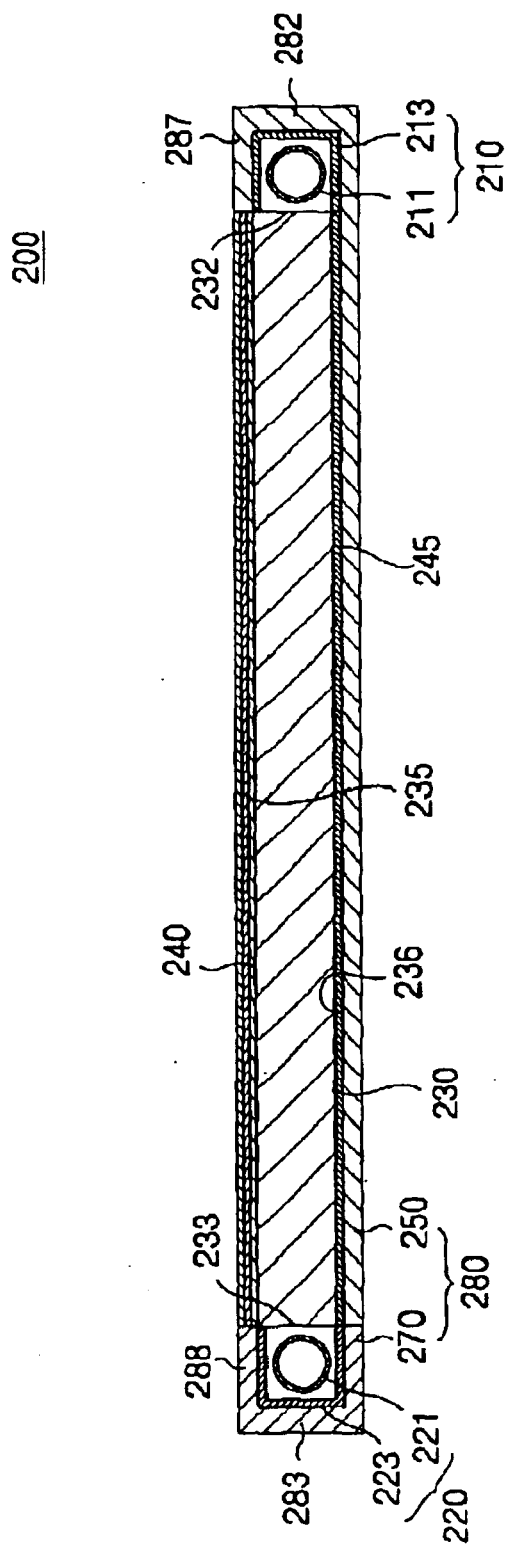
FIG. 6 is a cross-sectional view taken along the line III–III' of the backlight assembly shown in FIG. 4.

FIG. 4 is a perspective view showing a combination structure of the backlight assembly shown in FIG. 2. FIG. 5 is a cross-sectional view taken along the line II–II' of the combination structure of the backlight assembly shown in FIG. 4. FIG. 6 is a cross-sectional view taken along the line III–III' of the combination structure of the backlight assembly shown in FIG. 4.

Referring to FIGS. 4 to 6, the light guide plate 230 includes first to fourth side surfaces 231, 232, 233 and 234 for receiving the light, an emitting surface 235 for emitting the light, and a reflecting surface 236 for reflecting the light to the emitting surface 235. The light guide plate 230 guides the light to the LCD panel 110, which is input through the first to fourth side surfaces 231, 232, 233 and 234.

The first lamp unit 210 includes a first L-shaped lamp 211 having a first light generating portion G1 and a second light generating portion G2 integrally formed with the first generating portion G1, and a first lamp reflector 213 for covering the first L-shaped lamp 211. The second lamp unit 220 includes a second L-shaped lamp 221 having a third light generating portion G3 and a fourth light generating portion G4 integrally formed with the third generating portion G3, and a second lamp reflector 223 for covering the second L-shaped lamp 221.

As shown in FIGS. 5 and 6, the first and second light generating portions G1 and G2 of the first L-shaped lamp 211 are disposed adjacent to the first and second side surfaces 231 and 232 of the light guide plate 230, respectively. The third and fourth light generating portions G3 and G4 of the second L-shaped lamp 221 are disposed adjacent to the third and fourth side surfaces 233 and 234 of the light guide plate 230, respectively.

The first lamp reflector 213 has an L shape for covering the first and second light generating portions G1 and G2. The first lamp reflector 213 has a first end portion open to expose a first end portion of the first L-shaped lamp 211 and a second end portion not open to cover a second end portion opposite to the first end portion of the first L-shaped lamp 211. The first lamp reflector 213 reflects the light from the first L-shaped lamp 211 to the light guide plate 230. Similarly, the second lamp reflector 223 has an L shape for covering the third and fourth light generating portions G3 and G4. The second lamp reflector 223 has a first end portion open to expose a first end portion of the second L-shaped lamp 221 and a second end portion not open to cover a second end portion opposite to the first end portion of the second L-shaped lamp 221. The second lamp reflector 223 reflects the light from the second L-shaped lamp 221 to the light guide plate 230. The first and second lamp reflectors 213 and 223 are fixed to the mold frame 280, for example, by adhesive material such as adhesive tape.

Referring to FIGS. 5 and 6, the mold frame 280 includes a bottom surface 285, first to fourth sidewalls 281, 282, 283 and 284 extended from the bottom surface 285 so as to provide a receiving space, and first to fourth upper surfaces 286, 287, 288 and 289 extended from the first to fourth sidewalls 281, 282, 283 and 284, respectively. The first to fourth upper surfaces 286, 287, 288 and 289 are extended in parallel to the bottom surface 285. The light guide plate 230 is received in the receiving space, so that the first to fourth side surfaces 231, 232, 233 and 234 face the first to fourth sidewalls 286, 287, 288 and 289, respectively.

The first light generating portion G1 is disposed between the first side surface 231 and the first sidewall 281, and the second light generating portion G2 is disposed between the second side surface 232 and the second sidewall 282. The third light generating portion G3 is disposed between the third side surface 233 and the third sidewall 283, and the fourth light generating portion G4 is disposed between the fourth side surface 234 and the fourth sidewall 284. The optical sheets 240 are disposed on the light guide plate 230.

Figure 7:
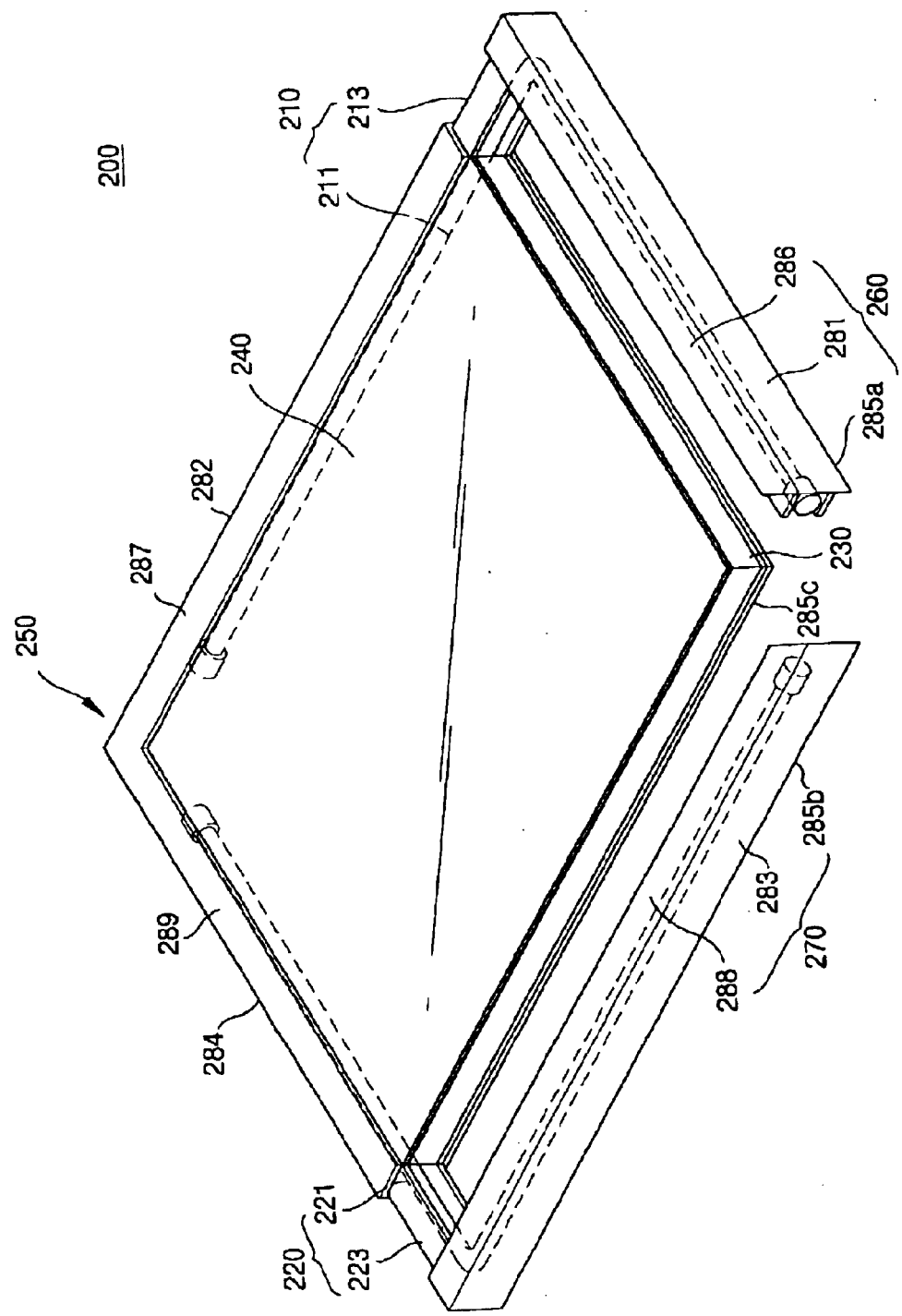
FIG. 7 is a perspective view showing a separated structure of the first and second lamp units shown in FIG. 4.

FIG. 7 is an exploded, perspective view of the first and second lamp units shown in FIG. 4.

Referring to FIG. 7, the first sidewall 281 may be separated from the second and third sidewalls 282 and 283, and the first upper surface 286 integrally formed with the first sidewall 281 may be separated from the second and third upper surfaces 287 and 288. The first bottom surface 285*a* integrally formed with the first sidewall 281 and corresponding to the first upper surface 286 may be separated from a third bottom surface 285*c*. Hereinafter, the first sidewall 281, first upper surface 286 and first bottom surface 285*a* are referred to as a "first mold part 260".

The third sidewall 283 may be separated from the first and fourth sidewalls 281 and 284, and the third upper surface 288 integrally formed with the third sidewall 283 may be separated from the first and fourth upper surfaces 286 and 289. A second bottom surface 285*b* integrally formed with the third sidewall 283 and corresponding to the third upper surface 288 may be separated from the third bottom surface 285*c*. Hereinafter, the third sidewall 283, third upper surface 288 and second bottom surface 285*b* are referred to as a "second mold part 270". The remaining part of the mold frame, except for the first and second mold parts 260 and 270, is referred to as a "third mold part 250". The third mold part 250 includes the second sidewall 282, the fourth sidewall 284 connected to the second sidewall 282, the second and fourth upper surfaces 287 and 289 respectively extended from the second and fourth sidewalls 282 and 284, and the third bottom surface 285*c*.

When the first mold part 260 is separated from the third mold part 250, the first lamp unit 210 is withdrawn along with the first mold part 260 from the third mold part 250. When the second mold part 270 is separated from the third mold part 250, the second lamp unit 220 is withdrawn along with the second mold part 270 from the third mold part 250.

This is because the first lamp reflector 213 is adhered to the first mold part 260, for example, by adhesive and not adhered to the third mold part 250. Thus, the first lamp unit 210 may be separated from the third mold part 250 when the first mold part 260 is separated from the second and third mold parts 270 and 250. Further, since the second lamp reflector 223 is adhered to the second mold part 270 and not adhered to the third mold part 250, the second lamp unit 220 may be separated from the third mold part 250 when the second mold part 270 is separated from the first and third mold parts 260 and 250.

Accordingly, when the first and second L-shaped lamps 211 and 221 are damaged, the first and second L-shaped lamps 211 and 221 can be easily replaced without entirely disassembling the backlight assembly 200.

FIG. 7 shows an exemplary embodiment of the backlight assembly 200 having a structure of disassembling the first and second mold parts 260, 270 from the mold frame 280. It is difficult to withdraw the first and second lamp units 210 and 220 from the sides of the second and fourth sidewalls 282 and 284 in case that the data and gate PCBs 120 and 130 are bent to a rear surface of the mold frame 280 while covering the second and fourth sidewalls 282 and 284 of the mold frame 280. Thus, in this case the first and second lamp units 210 and 220 are withdrawn from the sides of the first and third sidewalls 281 and 283 on which the data and gate PCBs 120 and 130 are not disposed.

However, assuming that the LCD apparatus 500 employs an integrated PCB (not shown), the first and second lamp units 210 and 220 may be withdrawn through three sides of the first to fourth sidewalls 281, 282, 283 and 284 of the mold frame 280 except only one sidewall on which the integrated PCB is disposed.

Figure 8:
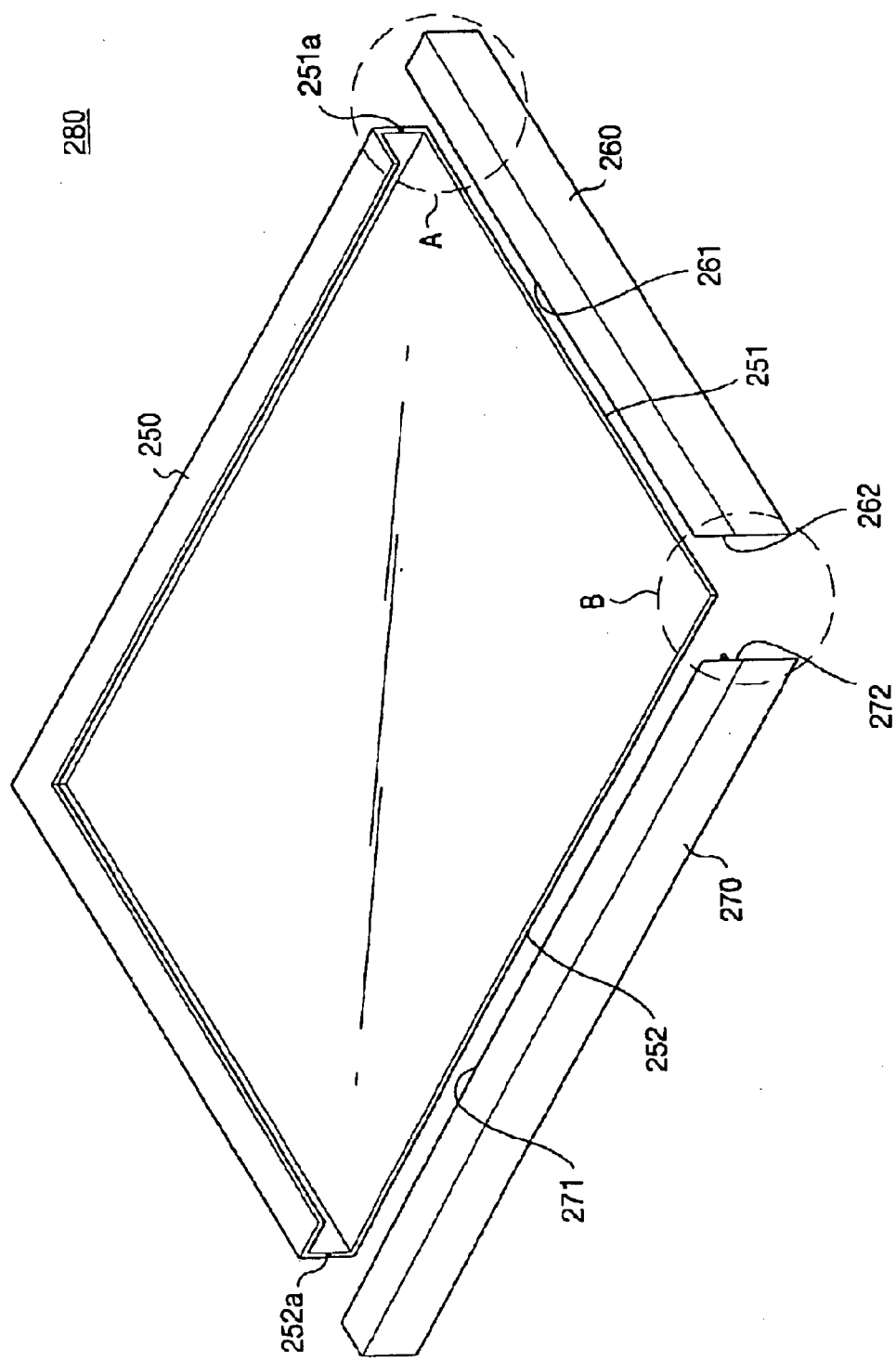
FIGS. 8 and 11 are perspective views showing the mold frame shown in FIG. 4.
Figure 9:
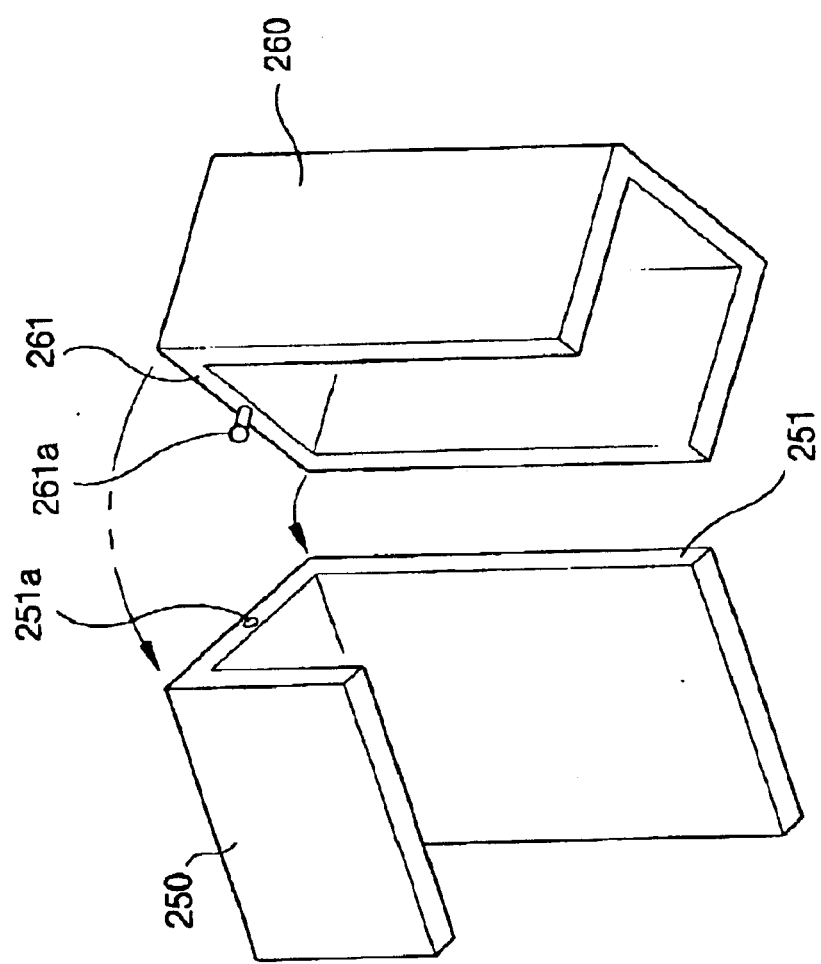
FIGS. 9 and 10 are partially enlarged views of the mold frame shown in FIG. 8.
Figure 10:
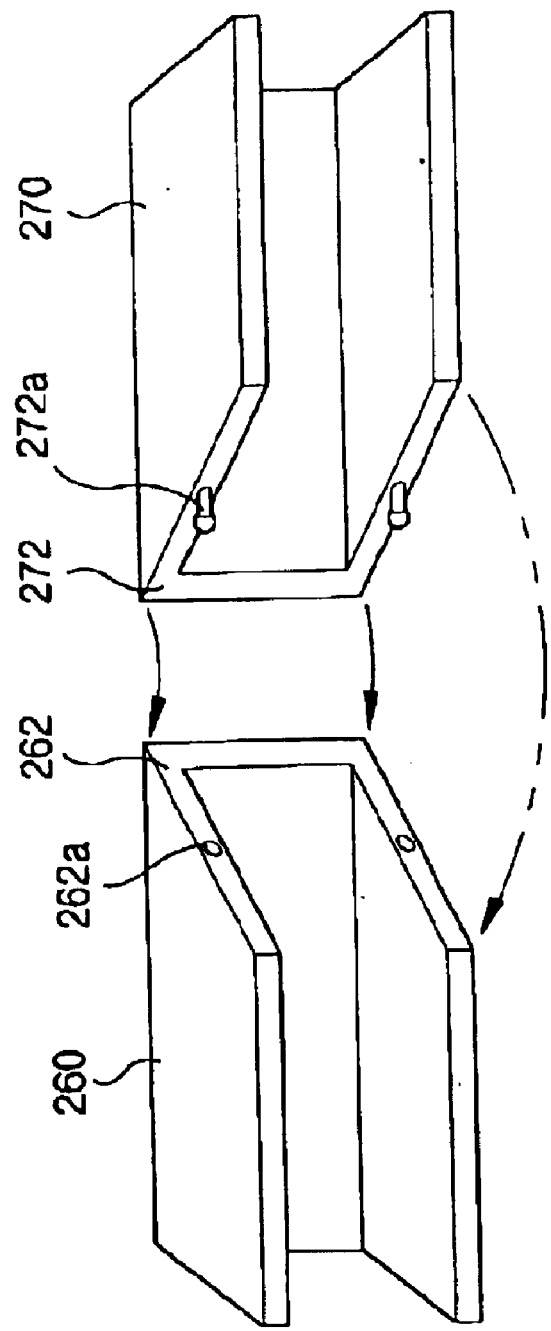
Figure 11:
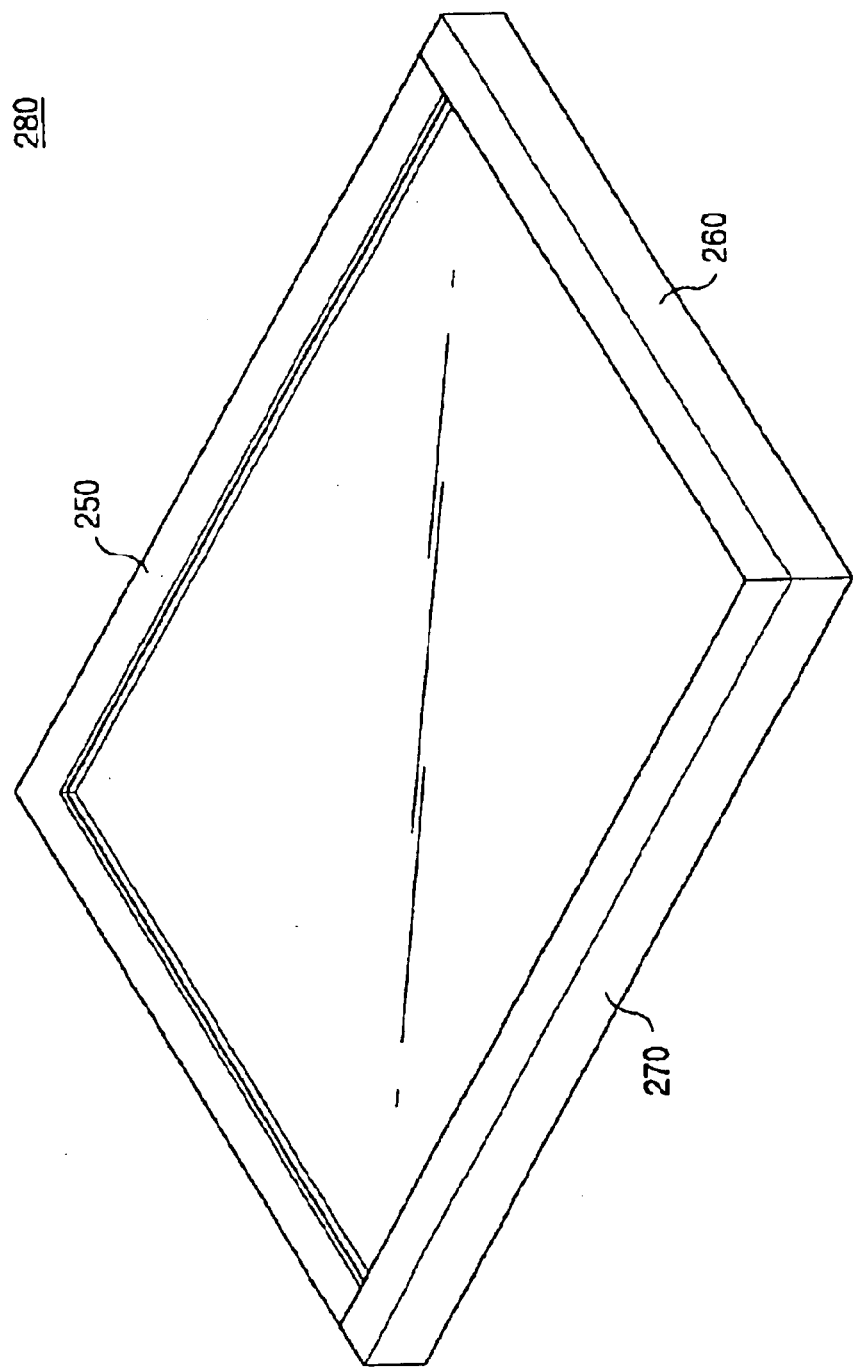

FIGS. 8 and 11 are perspective views showing the mold frame shown in FIG. 4. FIGS. 9 and 10 are partially enlarged views showing a combination structure of the mold frame shown in FIG. 8.

Referring to FIGS. 8 and 9, the mold frame 280 includes the first, second and third mold parts 260, 270 and 250. The third mold part 250 is provided with a first engaging hole 251a disposed on a first end portion 251 thereof which comes in contact with the first mold part 260 and provided with a second engaging hole 252a disposed on a second end portion 252 thereof which comes in contact with the second mold part 270. The first mold part 260 is provided with a first engaging protrusion 261a corresponding to the first engaging hole 251a and disposed on a third end portion thereof, and the second mold part 270 is provided with a second engaging protrusion (not shown) corresponding to the second engaging hole 252a and disposed on a fourth end portion 271 thereof.

Accordingly, the first mold part 260 is combined to the third mold part 250 by engaging the first engaging protrusion 261a into the first engaging hole 251a. The second mold part 270 is coupled to the third mold part 250 by engaging the second engaging protrusion into the second engaging hole 252a.

As shown in FIG. 9, the first engaging protrusion 261a is formed such that a cross-sectional surface of the area integrally connected to the first mold part 260 has an areal size (e.g., diameter) smaller than that of a cross-sectional surface of the end portion of the first engaging protrusion 261a. The first engaging hole 251a has a shape matching with the first engaging protrusion 261a. When the first engaging protrusion 261a is engaged into the first engaging hole 251a, the first engaging hole 251a is momentarily expanded to receive the end portion of the first engaging protrusion 261a. To facilitate such expansion, the first mold part 260 may be made of plastic material. The first engaging hole 251a is returned to the initial state after completely receiving the first engaging protrusion 261a, so that the first engaging protrusion 261a may be fixed to the first engaging hole 251a. The second engaging protrusion may have a shape identical to that of the first engaging protrusion 261a.

Referring to FIGS. 8 and 10, the first mold part 260 is provided with a third engaging hole 262a disposed on a fifth end portion 262 thereof which comes in contact with the second mold part 270. The second mold part 270 is provided with a third engaging protrusion 272a disposed on a sixth end portion 272 thereof which comes in contact with the first mold part 260. The third engaging protrusion 272a is engaged into the third engaging hole 262a.

Accordingly, the second mold part 270 is combined to the first mold part 260 by engaging the third engaging protrusion 272a into the third engaging hole 262a. The third engaging protrusion 272a may have a shape identical to the first and second engaging protrusions.

By combining the first, second and third mold parts 260, 270 and 250, the mold frame 280 is formed as shown in FIG. 11. In FIGS. 8 to 10, the first, second and third mold parts 260, 270 and 250 may be combined to each other using other assembling parts such as screws or hinges.

Figure 12:
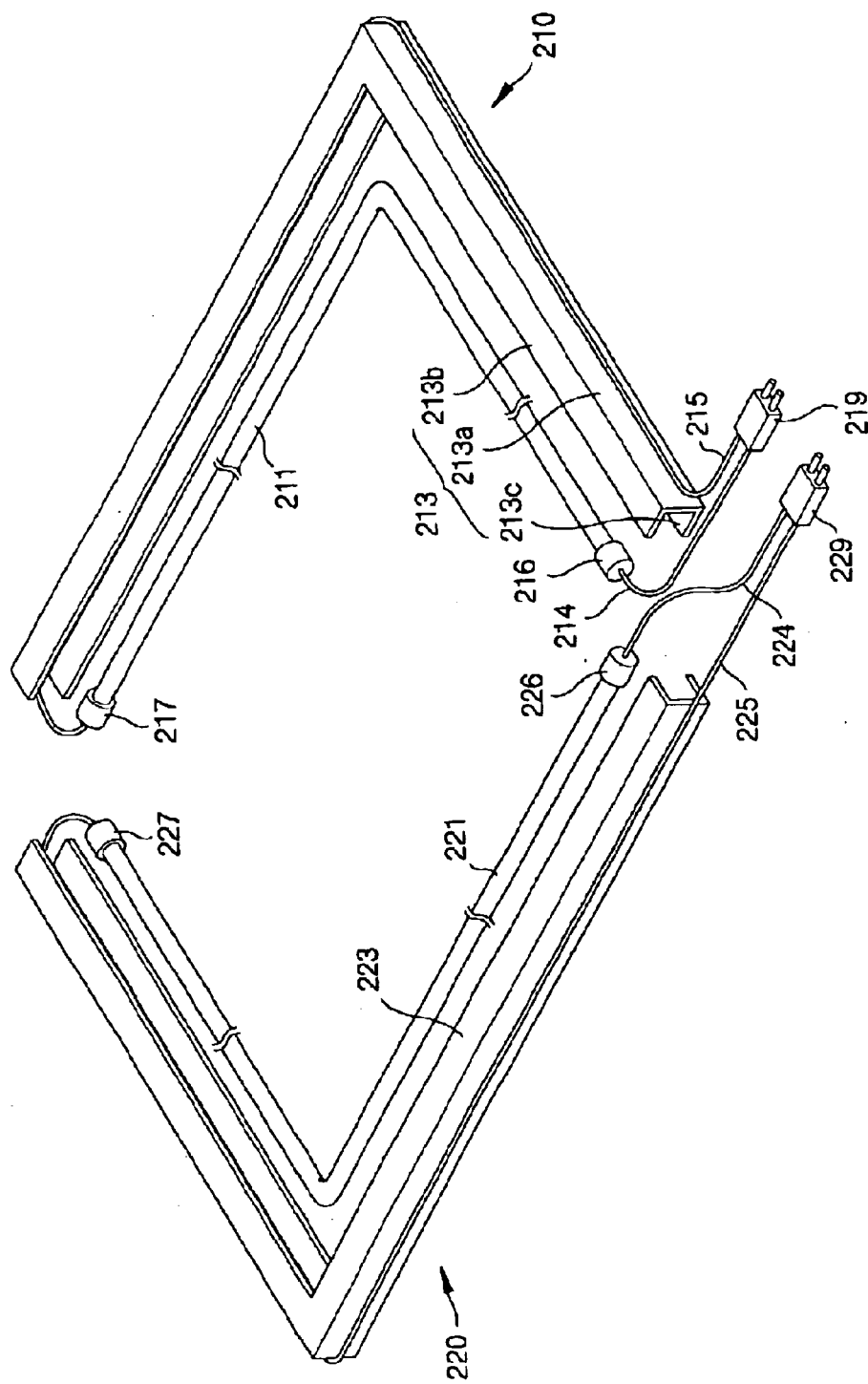
FIG. 12 is a perspective view showing a structure of the first and second lamp units shown in FIG. 4.

FIG. 12 is a perspective view showing a structure of the first and second lamp units shown in FIG. 4.

Referring to FIG. 12, the first lamp unit 210 includes the first L-shaped lamp 211 and the first lamp reflector 213. The first L-shaped lamp 211 includes first and second electrodes (not shown) disposed at the end portions thereof, respectively. The first and second electrodes may be disposed on either inner or outer surface of the first L-shaped lamp 211.

The first lamp unit 210 includes a first power line 214 electrically connected to the first electrode and a second power line 215 electrically connected to the second electrode. The first power line 214 provides electrical connection between the first electrode and a first connector 219, and the second power line 215 provides electrical connection between the second electrode and the first connector 219. The first connector 219 is connected to a power supply device (not shown).

The power supply device supplies a high voltage to the first L-shaped lamp 211 through the first power line 214 and supplies a low voltage to the first L-shaped lamp 211 through the second power line 215. As shown in FIG. 12, the second power line 215 is extended from the second electrode toward the first electrode along the first L-shaped lamp 211 so that the first and second power lines 214, 215 are connected to the first connector 219. Thus, one power supply device is needed for the first and second power lines 214, 215 instead of preparing two power supply devices for the respective power lines, so that the entire size of the LCD apparatus 500 is reduced. It should be noted that the first power line 214 may be extended, as does the second power line 215, to accomplish the same purpose.

The first L-shaped lamp 211 includes a first lamp holder 216 for holding the first power line 214 and a second lamp holder 217 for holding the second power line 215. The first and second lamp holders 216 and 217 are inserted into the end portions of the first L-shaped lamp 211, respectively, and serve for preventing the first and second power lines 214 and 215 from being disconnected with the first and second electrodes. The first L-shaped lamp 211 is received in the first lamp reflector 213 having an L shape identical to that of the first L-shaped lamp 211. The first lamp reflector 213 includes a first reflecting surface 213a, a second reflecting surface 213b extended from a first end portion of the first reflecting surface 213a and perpendicular to the first reflecting surface 213a, and a third reflecting surface 213c extended from a second end portion of the first reflecting surface 213a and facing the second reflecting surface 213b, so that the first lamp reflector 213 reflects the light from the first L-shaped lamp 211 to the light guide plate 230. The second and third reflecting surfaces 213b and 213c are extended by a same length.

The first lamp reflector 213 may further include a receiving groove disposed on the outer surface thereof so as to receive the second power line 215 and a fixing member for fixing the second power line 213 thereto.

The second lamp unit 220 includes the second L-shaped lamp 221, a second lamp reflector 223, a third power line 224, a fourth power line 225, a third lamp holder 226, a fourth lamp holder 227 and a second connector 229. The second lamp unit 220 has the substantially same structure as that of the first lamp unit 210, so that a detailed description with respect to the same parts, such as the second L-shaped lamp 221, second lamp reflector 223, third and fourth power lines 224 and 225, third and fourth lamp holders 226 and 227 and second connector 229 will be omitted.

The first and second lamp units 210 and 220 are disposed in a rectangular frame shape. Thus, the first lamp holder 216 of the first L-shaped lamp 211 is disposed adjacent to the third lamp holder 226 of the second L-shaped lamp 221, and the second lamp holder 217 of the first L-shaped lamp 211 is disposed adjacent to the fourth lamp holder 217 of the second L-shaped lamp 221.

Figure 13:
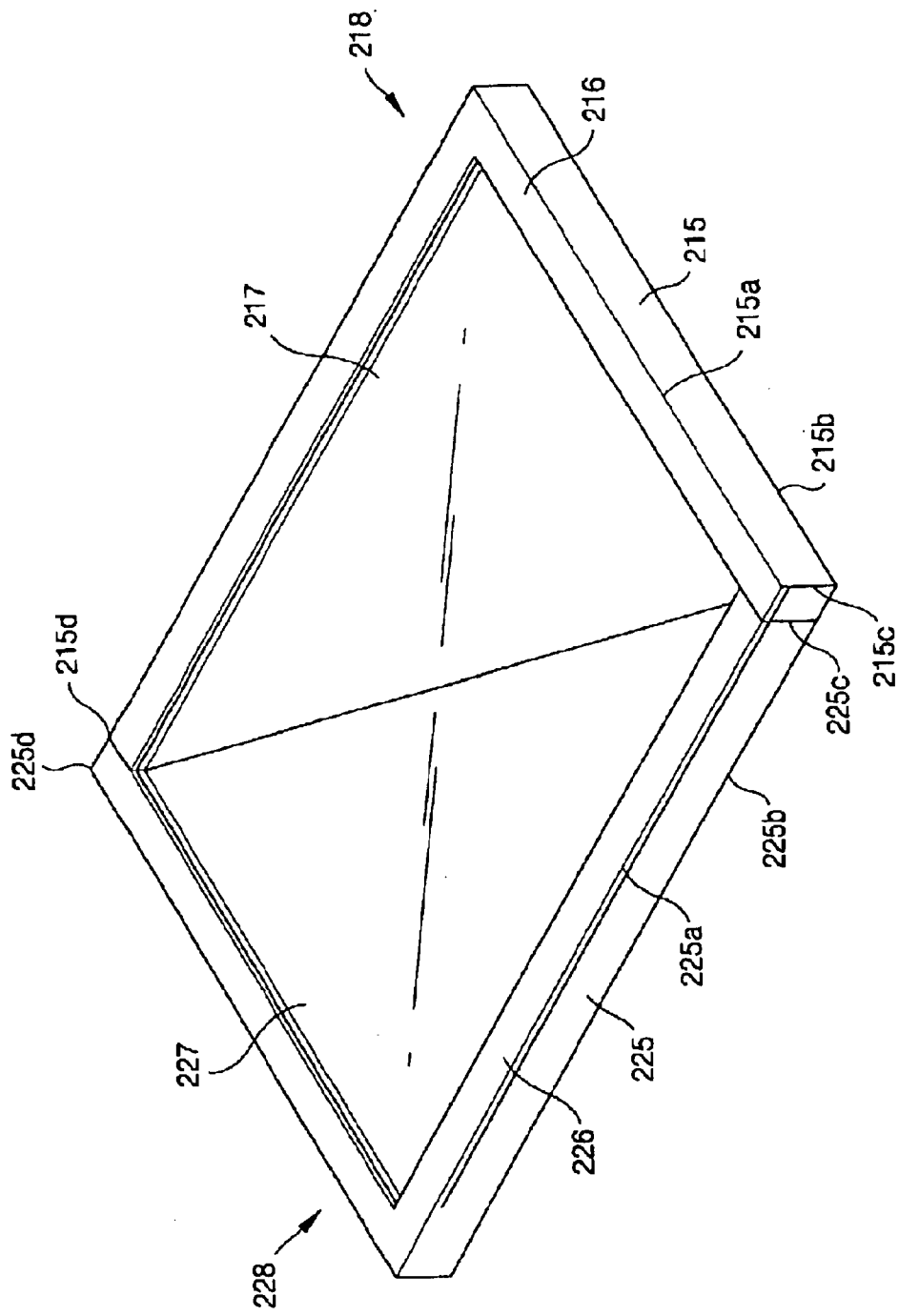
FIG. 13 is a perspective view showing first and second lamp reflectors according to another embodiment of the present invention.

FIG. 13 is a perspective view showing first and second lamp reflectors according to another embodiment of the present invention.

Referring to FIG. 13, a first lamp reflector 218 includes a first reflecting surface 215, a second reflecting surface 216 vertically extended from a first side edge 215*a* of the first reflecting surface 215, and a third reflecting surface 217 vertically extended from a second side edge 215*b* of the first reflecting surface 215. The second reflecting surface 216 faces the third reflecting surface 217, and the first and second side edges 215*a* and 215*b* are opposite to each other. The third reflecting surface 217 is extended to the line connecting between a first end edge 215*c* and a second end edge 215*d* of the first reflecting surface 215.

A second lamp reflector 228 includes a fourth reflecting surface 225, a fifth reflecting surface 226 vertically extended from a third side edge 225*a* of the fourth reflecting surface 225, and a sixth reflecting surface 227 vertically extended from a fourth side edge 225*b* of the fourth reflecting surface 225. The fifth reflecting surface 226 faces the sixth reflecting surface 227, and the third and fourth side edges 225*a* and 225*b* are opposite to each other. The sixth reflecting surface 227 is extended to the line connecting between a third end edge 225*c* and a fourth end edge 225*d* of the fourth reflecting surface 225.

The third reflecting surface 217 is in contact with the sixth reflecting surface 227, so that the third and sixth reflecting surfaces 217 and 227 are disposed in a rectangular shape. The third and sixth reflecting surfaces 217 and 227 reflect the light leaked from the light guide plate 230.

Figure 14:
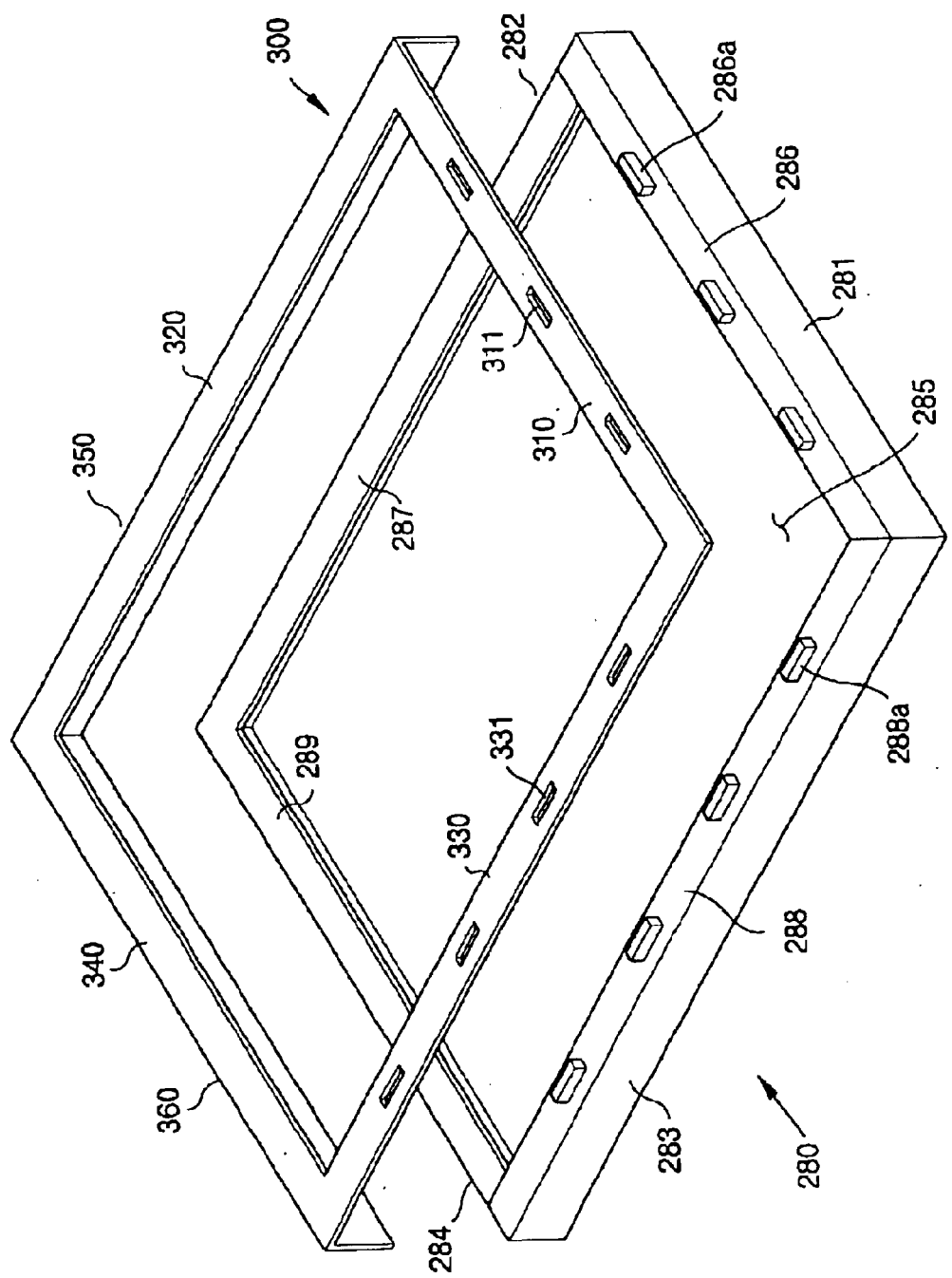
FIGS. 14 to 16 are schematic views showing a combination structure between the top chassis and the mold frame shown in FIG. 2.
Figure 15:
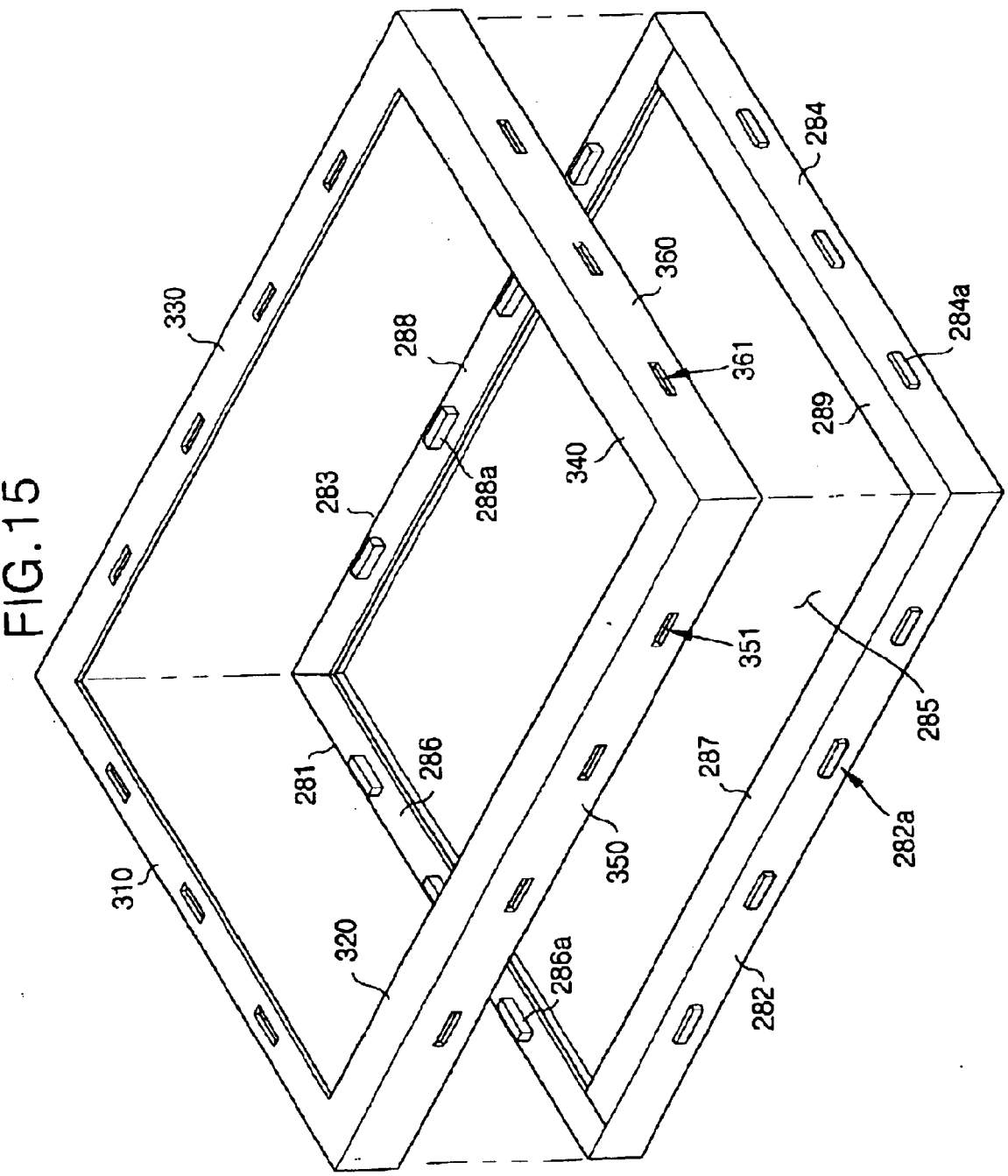
Figure 16:
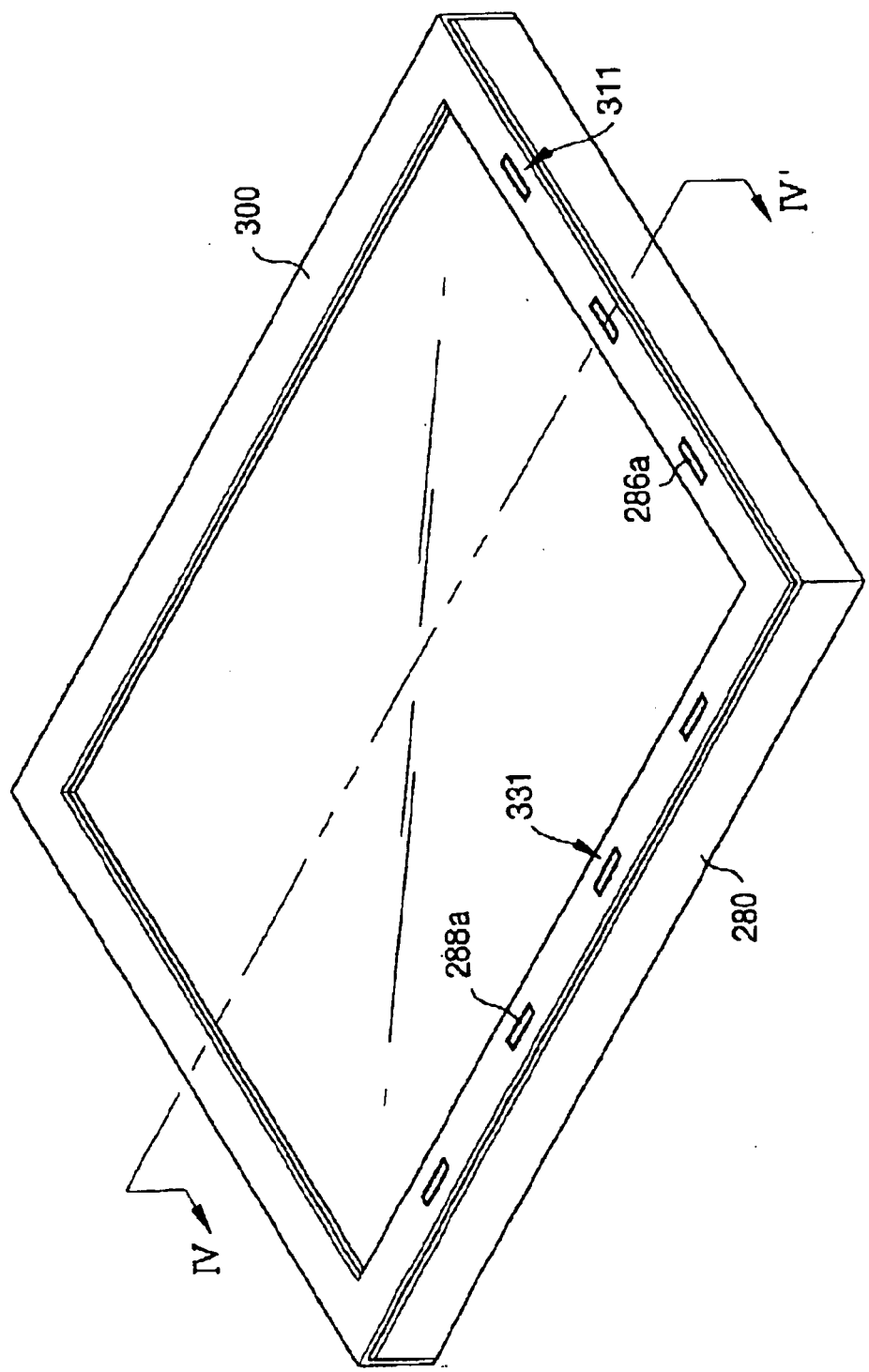
Figure 17:
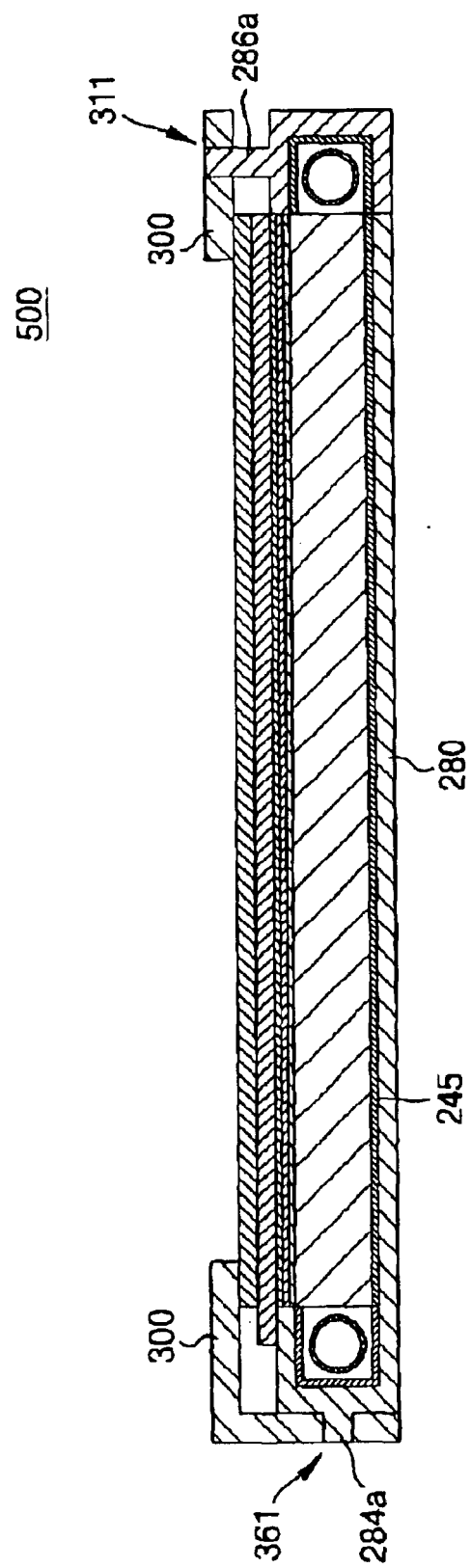
FIG. 17 is a cross-sectional view taken along the line IV–IV' of the structure of the top chassis and the mold frame shown in FIG. 16.

FIGS. 14 to 16 are schematic views showing a combination structure between the top chassis and the mold frame shown in FIG. 2. FIG. 17 is a cross-sectional view taken along the line IV–IV' of the structure of the top chassis and the mold frame shown in FIG. 16.

Referring to FIGS. 14 and 15, the top chassis 300 includes first to fourth cover surfaces 310, 320, 330 and 340 and first and second sidewall portions 350 and 360 extended from the second and fourth cover surfaces 320 and 340, respectively. The top chassis 300 is combined to the mold frame 280. Particularly, the first to fourth cover surfaces 310, 320, 330 and 340 of the top chassis 300 are combined to the first to fourth upper surfaces 286, 287, 288 and 289, respectively. The first and second sidewall portions 350 and 360 are combined to the second and fourth sidewalls 282 and 284 of the mold frame 280, respectively.

As shown in FIG. 14, the first and third cover surfaces 310 and 330 are provided with a plurality of first and second engaging holes 311 and 331, and the first and third upper surfaces 286 and 288 are provided with a plurality of first and second engaging protrusions 286*a* and 288*a* corresponding to the first and second engaging holes 311 and 331, respectively.

Referring to FIG. 15, the first and second sidewall portions 350 and 360 are provided with a plurality of third and fourth engaging holes 351 and 361, and the second and fourth sidewalls 282 and 284 are provided with a plurality of third and fourth engaging protrusions 282*a* and 284*a*, respectively.

As shown in FIGS. 16 and 17, when the top chassis 300 is combined to the mold frame 280, the first, second, third and fourth engaging protrusions 286*a*, 288*a*, 282*a* and 284*a* are engaged into the first, second, third and fourth engaging holes 311, 331, 351 and 361, respectively, so that the top chassis 300 is fixed to the mold frame 280.

Figure 18:
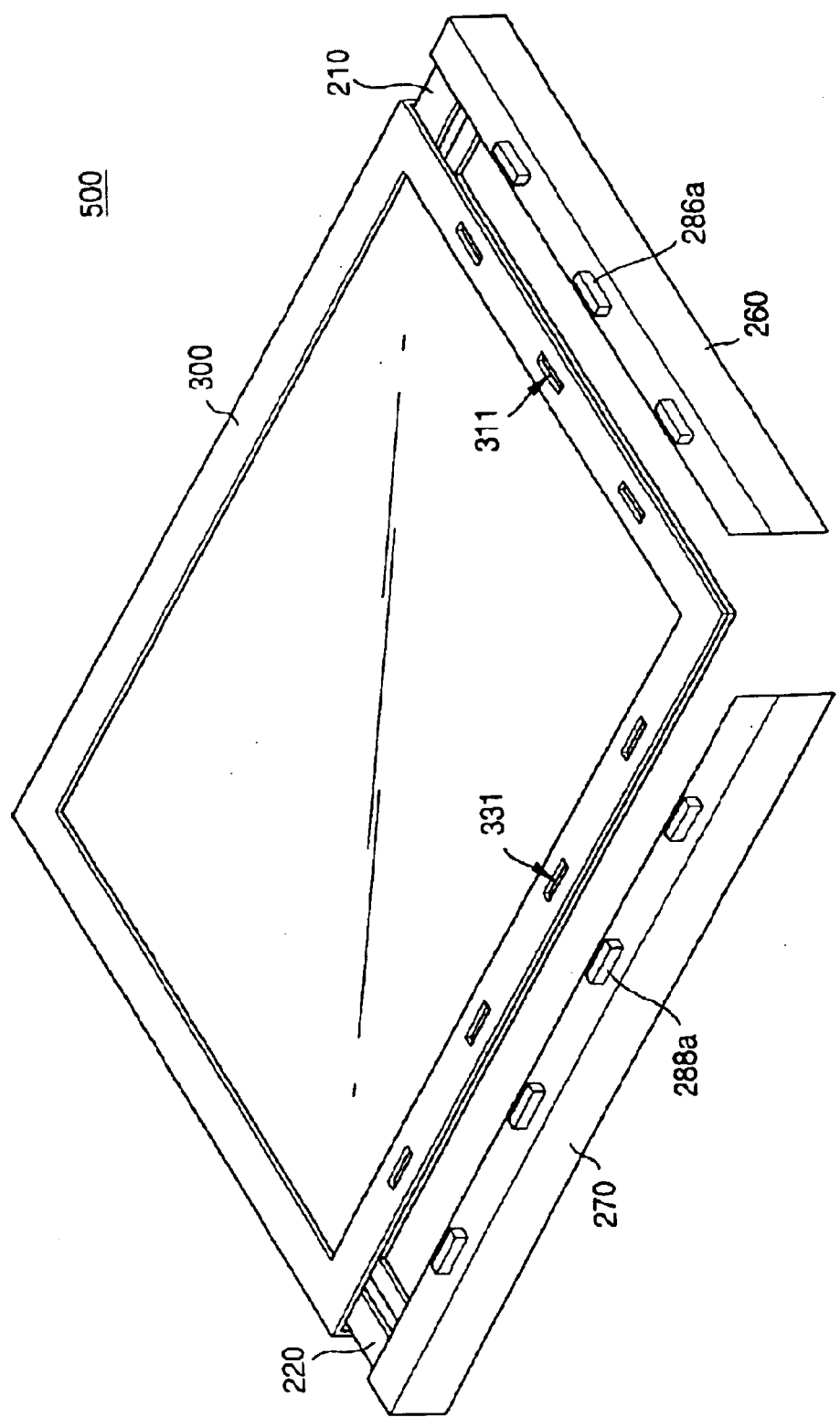
FIG. 18 is a perspective view for explaining a method of separating the first and second lamp units from the LCD apparatus shown in FIG. 16.

FIG. 18 is a perspective view for explaining a method for separating the first and second lamp units from the LCD apparatus shown in FIG. 16.

Referring to FIG. 18, in order to separate the first and second lamp units 210 and 220 from the LCD apparatus 500, the first and second mold parts 260 and 270 that cover the first and second lamp units 210 and 220 are separated from the top chassis 300. That is, the first and second mold parts 260 and 270 are separated from the top chassis 300 by disengaging the first and second engaging protrusions 286*a* and 288*a* of the first and second mold parts 260 and 270 from the first and second engaging holes 311 and 331 of the top chassis 300.

The first and second mold parts 260 and 270 may be separated from the third mold part without entirely removing the top chassis 300 because the top chassis 300 does not include sidewall portions corresponding to the first and second mold parts 260 and 270. Also, since the first and second mold parts 260 and 270 are combined to the top chassis 300 in a hook structure, the first and second mold parts 260 and 270 may be separated from the third mold part without entirely removing the top chassis 300.

While separating the first and second mold parts 260 and 270, the first mold part 260 is separated with the first lamp unit 210 and the second mold part 270 is separated with the second lamp unit 220. This is because the first and second lamp units 210 and 220 are combined to the first and second mold parts 260, 270, respectively.

In FIGS. 14 to 18, the top chassis 300 has only two sidewall portions 350 and 360. However, the top chassis 300 may be formed with four sidewall portions that combine to the first to fourth sidewalls 281, 282, 283 and 284, respectively. If the top chassis 300 is formed with the four sidewall portions, the top chassis 300 having the four sidewall portions has to be completely separated from the mold frame 280 before separating the first and second lamp units 210 and 220 from the LCD apparatus 500.

Figure 19:
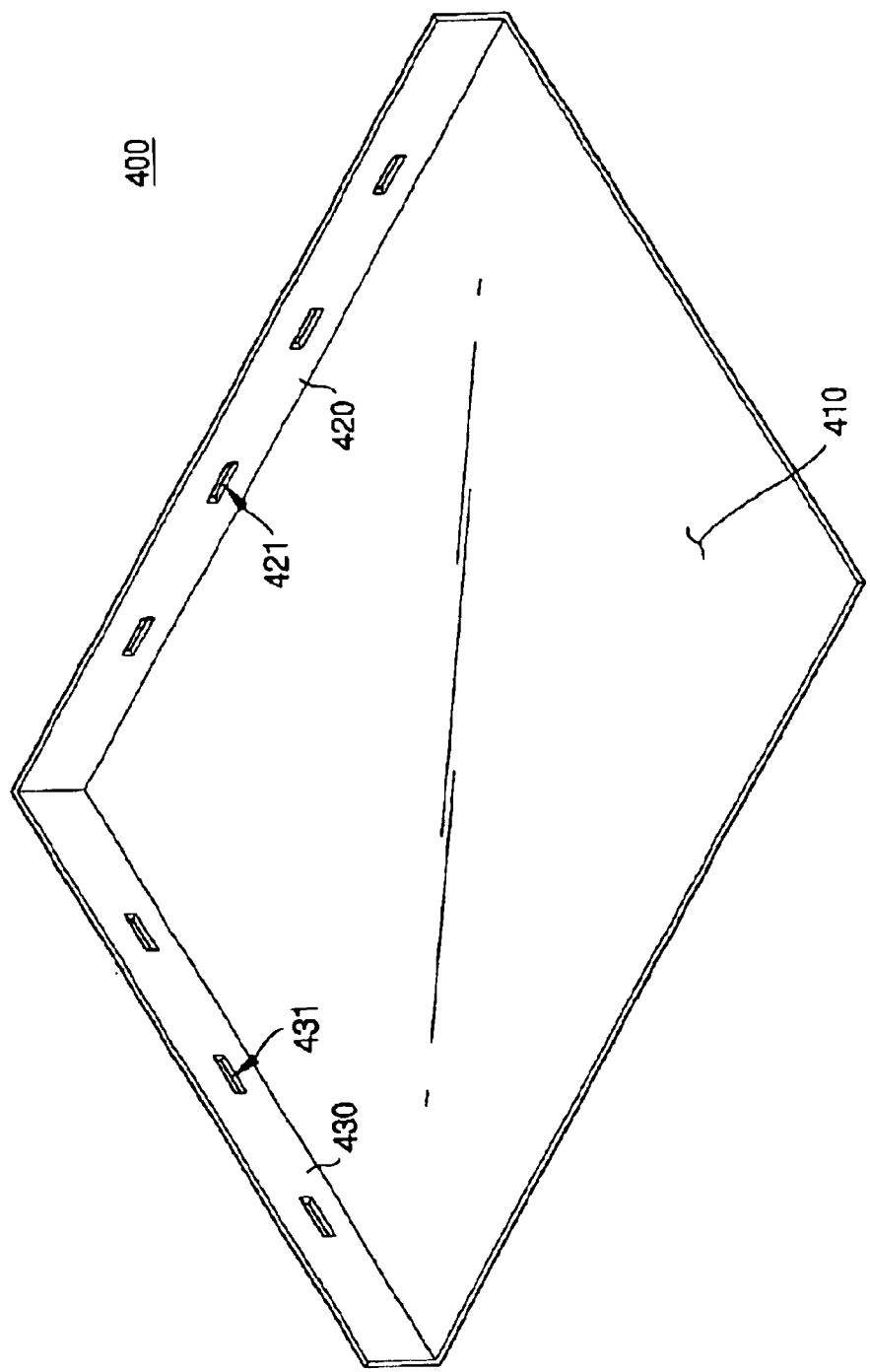
FIG. 19 is a perspective view showing a structure of the bottom chassis shown in FIG. 2.
Figure 20:
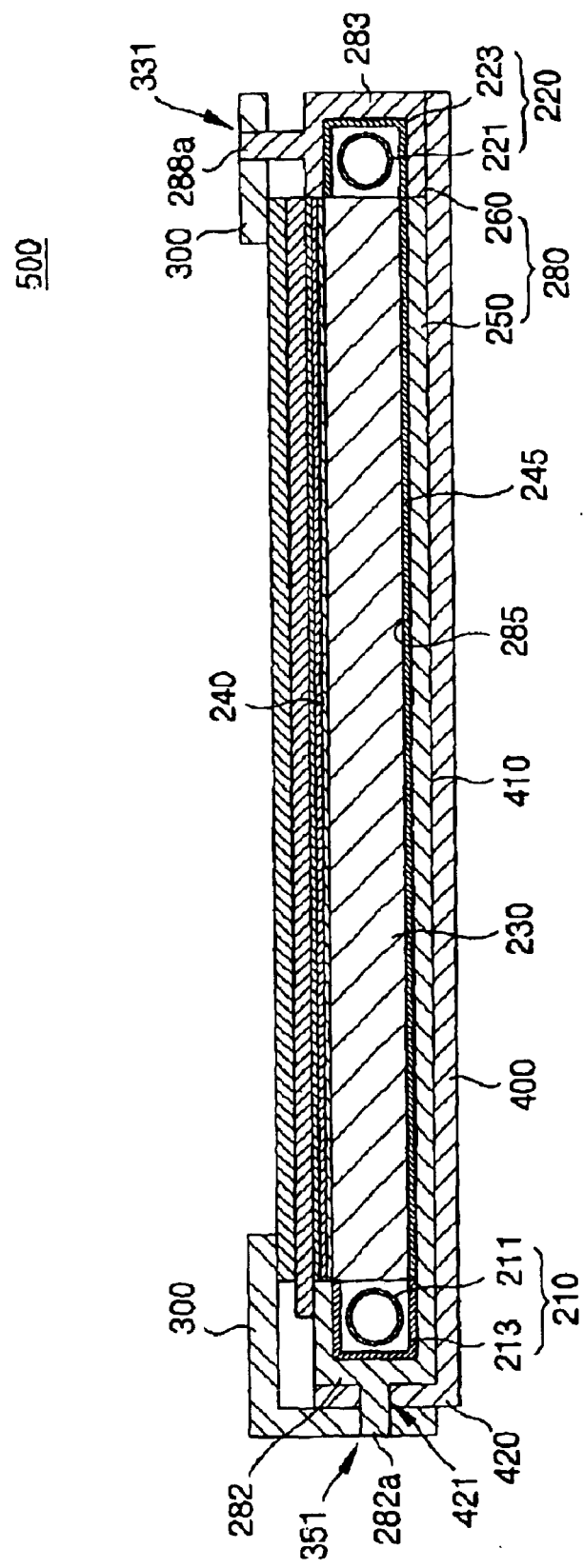
FIGS. 20 and 21 are cross-sectional views showing a combination structure of the bottom chassis shown in FIG. 2.
Figure 21:
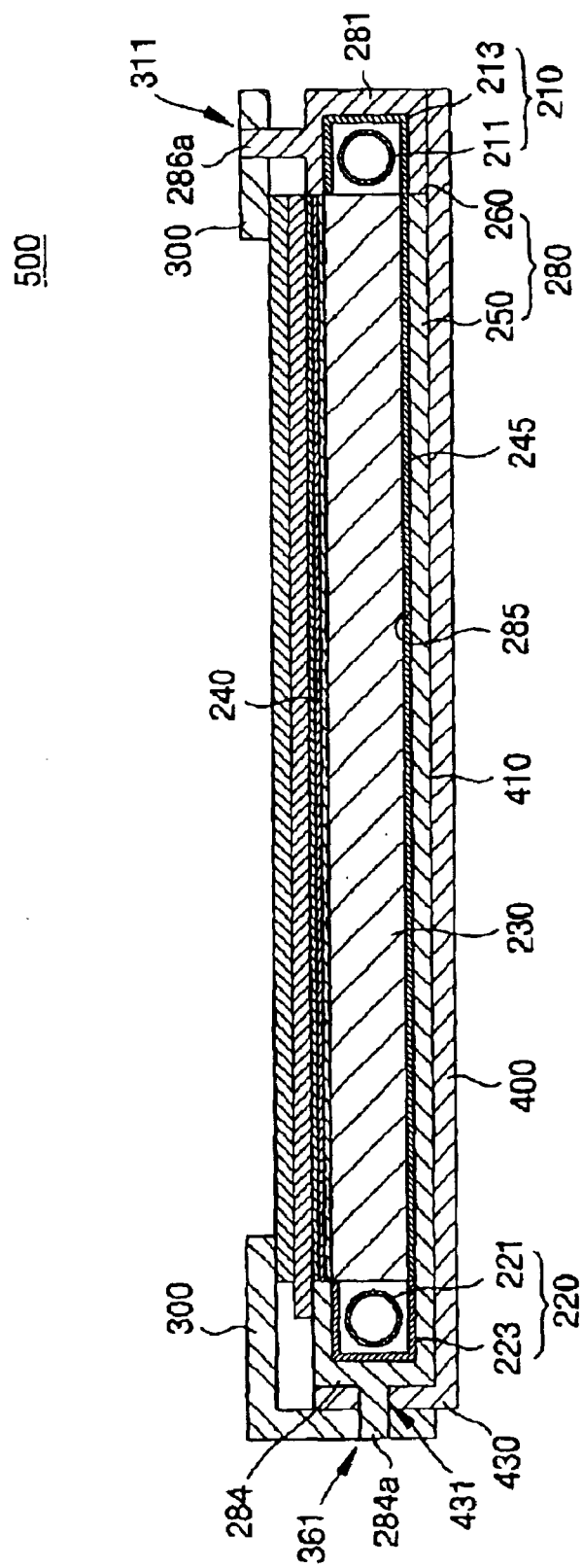

FIG. 19 is a perspective view showing a structure of the bottom chassis shown in FIG. 2. FIGS. 20 and 21 are cross-sectional views showing a combination structure of the bottom chassis shown in FIG. 2.

Referring to FIGS. 19 to 21, the bottom chassis 400 includes a receiving surface 410 for receiving the mold frame 280, light guide plate 230, first lamp unit 210 and second lamp unit 220, a third sidewall portion 420 extended from the receiving surface 410 and disposed between the second sidewall 282 of the mold frame 280 and the first sidewall portion 350 of the top chassis 300, and a fourth sidewall portion 430 extended from the receiving surface 410 and disposed between the fourth sidewall 284 of the mold frame 280 and the second sidewall portion 360 of the top chassis 300.

The third and fourth sidewall portions 420 and 430 are provided with a plurality of fifth and sixth engaging holes 421 and 431, respectively, to be combined with the third and fourth engaging protrusions 282*a* and 284*a*, respectively, of the mold frame 280. That is, when the mold frame 280 is received in the bottom chassis 400, the third and fourth engaging protrusions 282a and 284a are engaged into the fifth and sixth engaging holes 421 and 431, respectively, so that the mold frame 280 is fixed to the bottom chassis 400.

When the bottom chassis 400 is combined to the top chassis 300, the first and second sidewall portions 350 and 360 come in contact with the third and fourth sidewall portions 420 and 430. The third and fourth engaging protrusions 282a and 284a are engaged into the third and fourth engaging holes 351 and 361, thereby combining the top chassis 300 to the mold frame 280.

In FIGS. 19 to 21, the bottom chassis 400 has the third and fourth sidewall portions 420 and 430 and open portions corresponding to the first and third sidewalls 281 and 283 of the mold frame 280. Accordingly, the first and second lamp units 210 and 220 may be separated from the LCD apparatus 500 without separating the bottom chassis 400 from the mold frame 280.

However, the bottom chassis 400 may further include fifth and sixth sidewall portions (not shown) corresponding to the first and third sidewalls 281 and 283 of the mold frame 280. In this case, the bottom chassis 400 having the fifth and sixth sidewall portions has to be completely separated from the mold frame 280 before separating the first and second lamp units 210 and 220 from the LCD apparatus 500.

Figure 22:
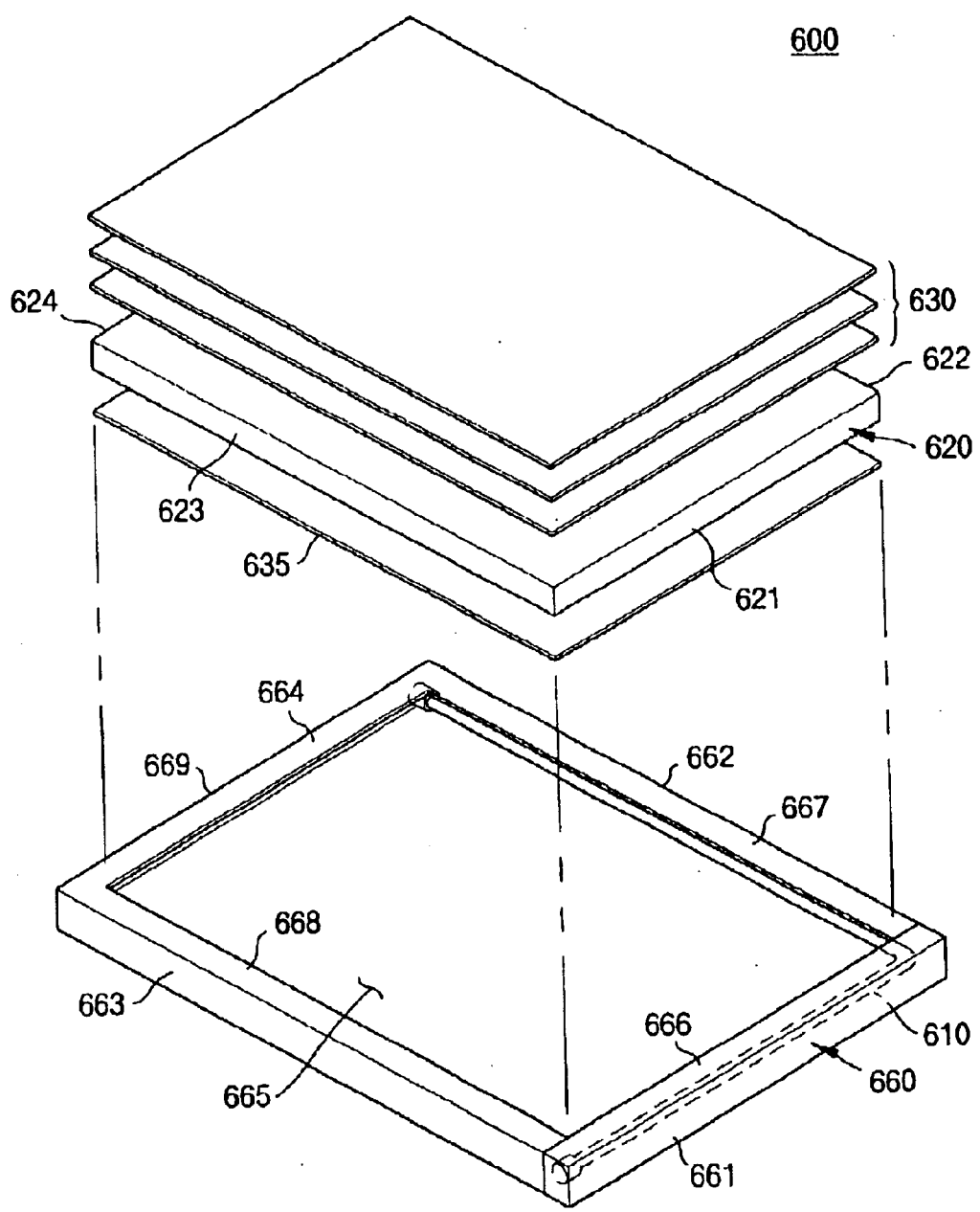
FIG. 22 is a perspective view showing a backlight assembly according to another embodiment of the present invention.
Figure 23:
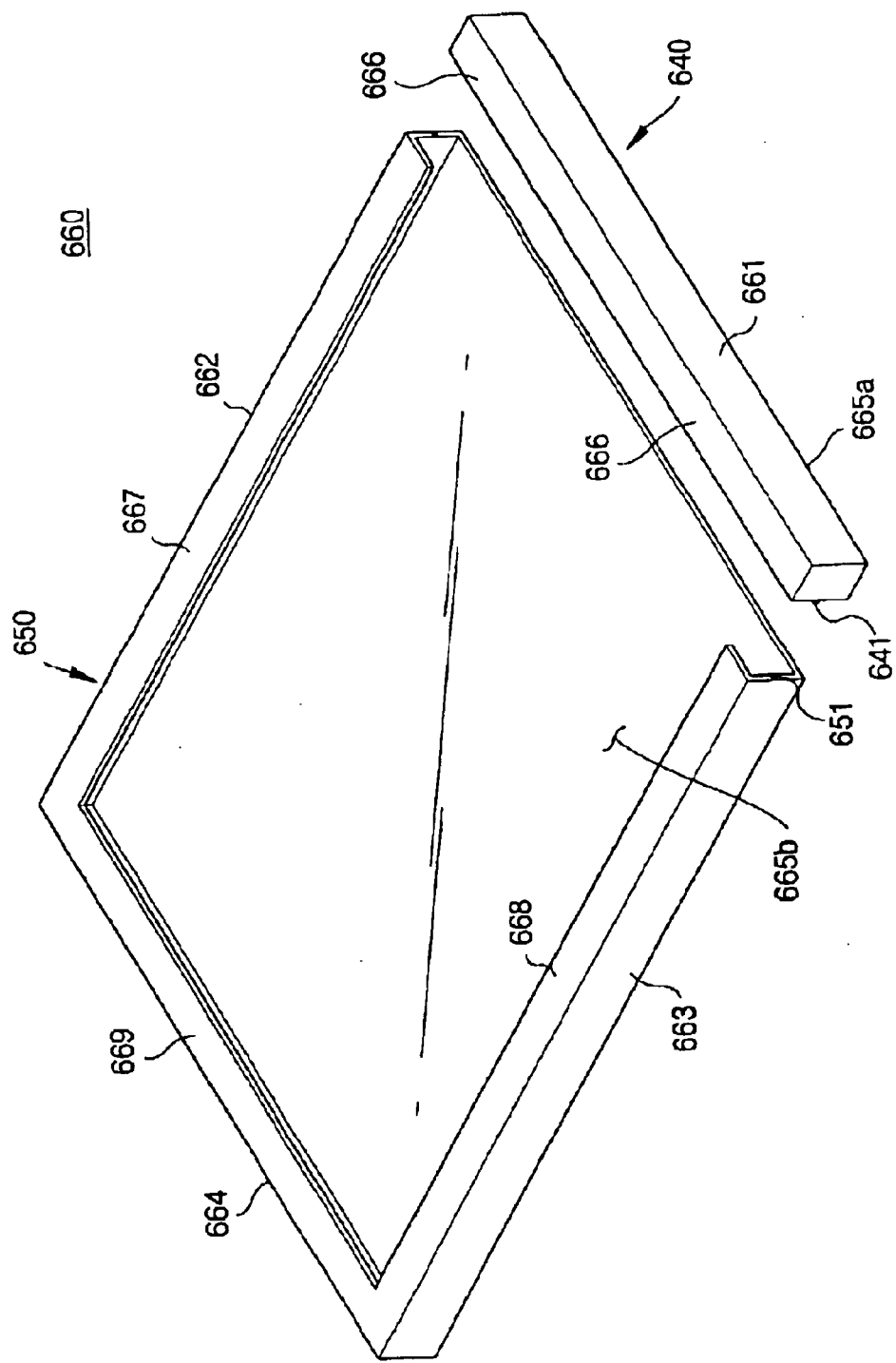
FIG. 23 is a perspective view showing a mold frame shown in FIG. 22.

FIG. 22 is a perspective view showing a backlight assembly according to another exemplary embodiment of the present invention. FIG. 23 is a perspective view showing a mold frame shown in FIG. 22.

Referring to FIG. 22, the backlight assembly 600 includes a lamp unit 610 for generating light, a light guide plate 620 for guiding the light, one or more optical sheets 630 for enhancing uniformity of the light emitted from the light guide plate 620, and a reflecting plate 635 for reflecting the light leaked from the light guide plate 620. The lamp unit 610, light guide plate 620, optical sheets 630 and reflecting plate 635 are received in a mold frame 660. The light guide plate 620 includes an emitting surface for emitting the light, a reflecting surface for reflecting the light to the emitting surface, and first to fourth side surfaces 621, 622, 623 and 624 connecting between the emitting and reflecting surfaces.

The mold frame 660 includes a bottom surface 665, first to fourth sidewalls 661, 662, 663 and 664 extended from the bottom surface 665 to provide a receiving space, and first to fourth upper surfaces 666, 667, 668 and 669 extended from the first to fourth sidewalls 661, 662, 663 and 664, respectively, and facing the bottom surface 665. The reflecting plate 635 and light guide plate 620 are sequentially received in the receiving space. The first to fourth side surfaces 621, 622, 623 and 624 of the light guide plate 620 come in contact with the first to fourth sidewalls 661, 662, 663 and 664, respectively, of the mold frame 660. The lamp unit 610 is disposed between the first side surface 621 and the first sidewall 661 in one part and between the second side surface 622 and the second sidewall 662 in the other part. The optical sheets 630 are disposed on the light guide plate 620.

As shown in FIG. 23, the first sidewall 661 is separated from the second and third sidewalls 662 and 663, the first upper surface 666 connected to the first sidewall 661 is separated from the second and third upper surfaces 667 and 668, and the bottom surface 665 is divided into a first bottom surface 665a and a second bottom surface 665b. The first bottom surface 665a has a size corresponding to that of the first upper surface 666. Hereinafter, a part including the first sidewall 661, first upper surface 666 and first bottom surface 665a of mold frame 660 is referred to as a "first mold part 640" and the remaining part of the mold frame 660 is referred to as a "second mold part 650".

The first mold part 640 is provided with a first engaging protrusion 641 protruded from an end portion thereof that comes in contact with the second mold part 650. The second mold part 650 is provided with a first engaging hole 651 corresponding to the first engaging protrusion 641. The first mold part 640 is combined with the second mold part 650 by engaging the first engaging protrusion 641 into the first engaging hole 651, to be configured to the mold frame 660.

Figure 24:
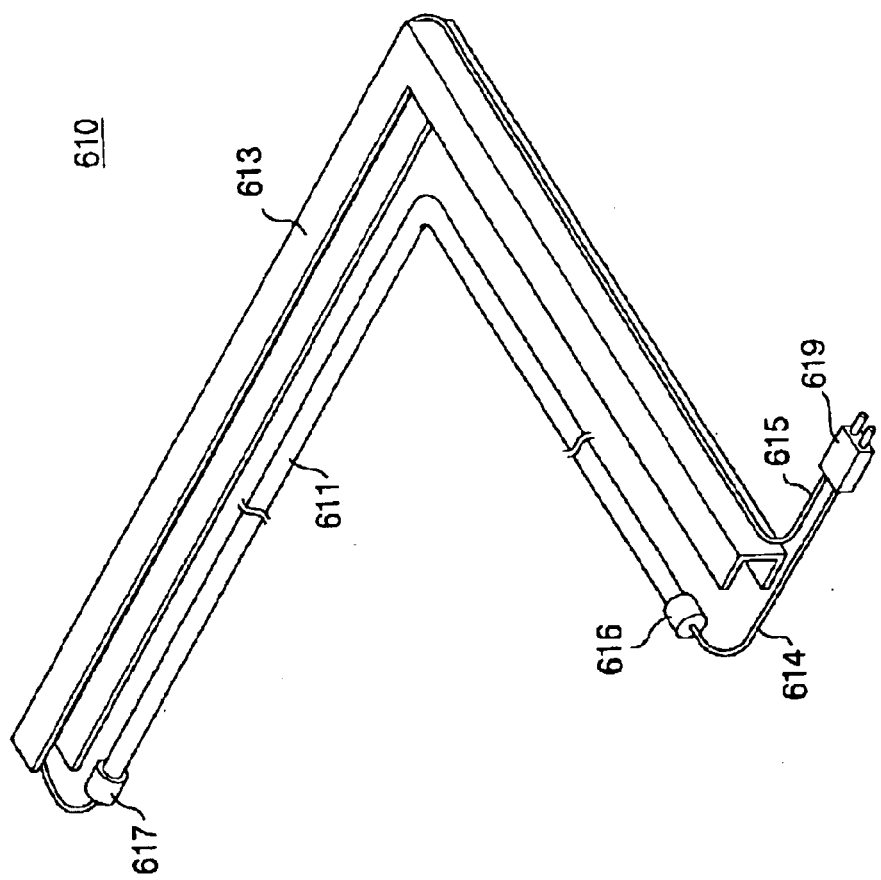
FIG. 24 is a perspective view showing a structure of the lamp unit shown in FIG. 22.
Figure 25:
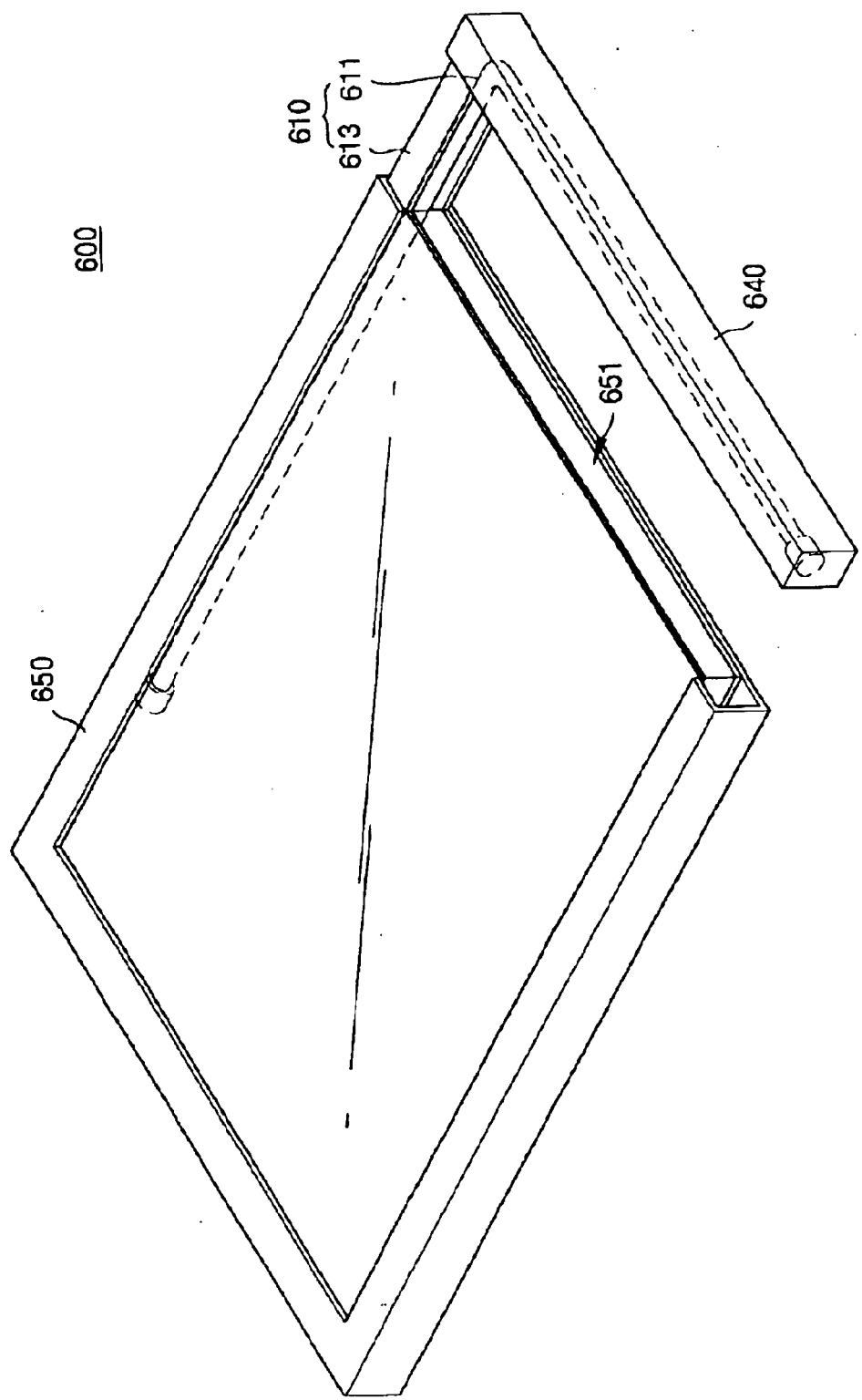
FIG. 25 is a perspective view for explaining a method of separating the lamp unit from the mold frame.

FIG. 24 is a perspective view showing a structure of the lamp unit shown in FIG. 22. FIG. 25 is a perspective view for explaining a method of separating the lamp unit from the mold frame.

Referring to FIG. 24, the lamp unit 610 includes a L-shaped lamp 611 and a lamp reflector 613. The L-shaped lamp 611 includes first and second electrodes (not shown), which are in the L-shaped lamp 611. The lamp unit 610 further includes first and second power lines 614 and 615 connected to the first and second electrodes, respectively, and extended from the end portions of the L-shaped lamp 611. Also, the first and second power lines 614 and 615 are electrically connected to a power supply device (not shown) through a connector 619. The power supply device supplies a power to the L-shaped lamp 611 through the first and second power lines 614 and 615.

The power supply device supplies a high voltage to the L-shaped lamp 611 through the first power line 614 and supplies a low voltage to the L-shaped lamp 611 through the second power line 615. The second power line 615 is extended along the L-shaped lamp 611 and connected to the connector 619.

The L-shaped lamp 611 includes a first lamp holder 616 for holding the first power line 614 and a second lamp holder 617 for holding the second power line 615. The first and second lamp holders 616 and 617 are inserted into the end portions of the L-shaped lamp 611, respectively, so as to prevent the first and second power lines 614 and 615 from being disconnected with the first and second electrodes.

The L-shaped lamp 611 is received in the lamp reflector 613 having an L shape identical to that of the L-shaped lamp 611. The first lamp reflector 613 covers the L-shaped lamp 611 and exposes portions of the L-shaped lamp 611 facing the first and second side surfaces 621 and 622 of the light guide plate 620. The second power line 615 is fixed to an outer surface of the lamp reflector 613.

The lamp reflector 613 may further include a receiving groove disposed on the outer surface thereof so as to receive the second power line 615 or a fixing member for fixing the second power line 615 thereto.

Referring to FIG. 25, when the first mold part 640 is separated from the second mold part 650, the lamp unit 610 is exposed through an opening 651 of the second mold part 650. The lamp unit 610 is withdrawn through the opening 651, so that the lamp unit 610 may be completely separated from the backlight assembly 600.

When the first mold part 640 is separated from the second mold part 650, the lamp reflector 613 may be withdrawn from the backlight assembly 600 with the lamp unit 610 because the lamp reflector 613 is fixed to the first mold part 640, for example, by an adhesive.

Accordingly, where the L-shaped lamp 611 is damaged, the L-shaped lamp 611 can be easily replaced without entirely disassembling the backlight assembly 600.

Figure 26:
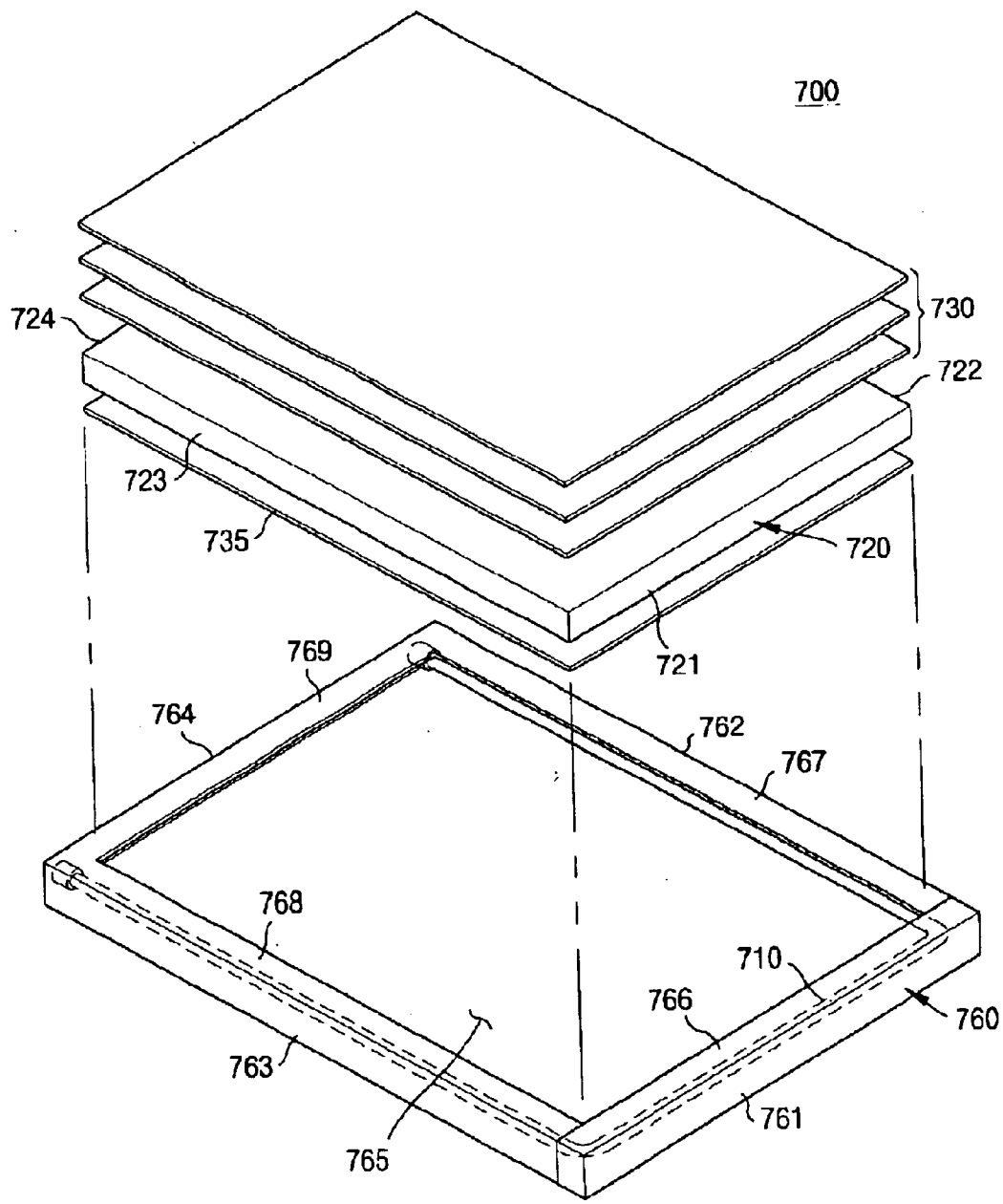
FIG. 26 is a perspective view showing a backlight assembly according to another embodiment of the present invention.
Figure 27:
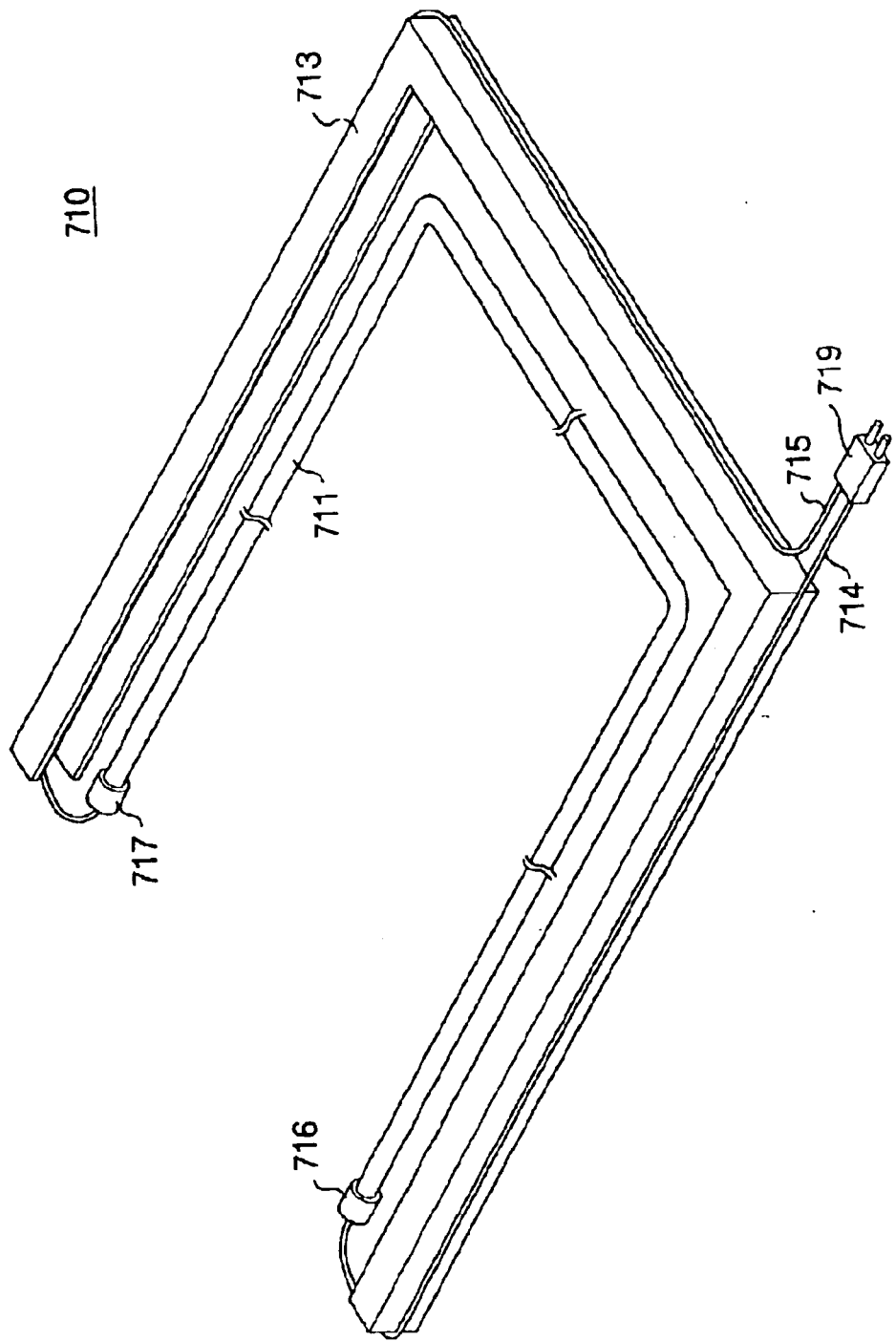
FIG. 27 is a perspective view showing a lamp unit shown in FIG. 26.

FIG. 26 is a perspective view showing a backlight assembly according to another exemplary embodiment of the present invention. FIG. 27 is a perspective view showing a lamp unit shown in FIG. 26.

Referring to FIGS. 26 and 27, the backlight assembly 700 includes a lamp unit 710 for generating light, a light guide plate 720 for guiding the light, one or more optical sheets 730 for enhancing uniformity of the light emitted from the light guide plate 720, and a reflecting plate 735 for reflecting the light leaked from the light guide plate 720. The lamp unit 710, light guide plate 720, optical sheets 730 and reflecting plate 735 are received in a mold frame 760. The light guide plate 720 includes an emitting surface for emitting the light, a reflecting surface for reflecting the light to the emitting surface, and first to fourth side surfaces 721, 722, 723 and 724 connecting between the emitting and reflecting surfaces.

The mold frame 760 includes a bottom surface 765, first to fourth sidewalls 761, 762, 763 and 764 extended from the bottom surface 765 to provide a receiving space and first to fourth upper surfaces 766, 767, 768 and 769 extended from the first to fourth sidewalls 761, 762, 763 and 764, respectively, and facing the bottom surface 765. The reflecting plate 735 and light guide plate 720 are sequentially received in the receiving space, so that the first to fourth side surfaces 721, 722, 723 and 724 of the light guide plate 720 come in contact with the first to fourth sidewalls 761, 762, 763 and 764 of the mold frame 760, respectively. A first portion of the lamp unit 710 is disposed between the first side surface 721 and the first sidewall 761, a second portion of the lamp unit 710 is disposed between the second side surface 722 and the second sidewall 662, and a third portion of the lamp unit 710 is disposed between the third side surface 723 and the third sidewall 763. The optical sheets 730 are disposed on the light guide plate 720.

As shown in FIG. 27, the lamp unit 710 includes a U-shaped lamp 711 and a U-shaped lamp reflector 713. The U-shaped lamp 711 includes first and second electrodes (not shown), which are in the U-shaped lamp 711. The lamp unit 710 further includes first and second power lines 714 and 715 connected to the first and second electrodes and extended from the end portions of the U-shaped lamp 711. Also, the first and second power lines 714 and 715 are electrically connected to a power supply device (not shown) through a connector 719. The power supply device supplies a power to the U-shaped lamp 711 through first and second power lines 714 and 715.

The U-shaped lamp 711 includes a first lamp holder 716 for holding the first power line 714 and a second lamp holder 717 for holding the second power line 715. The first and second lamp holders 716 and 717 are inserted into the end portions of the U-shaped lamp 711, respectively, so as to prevent the first and second power lines 714 and 715 from being disconnected with the first and second electrodes.

The U-shaped lamp reflector 713 covers the U-shaped lamp 711 and exposes portions of the U-shaped lamp 711 facing the first and second side surfaces 721 and 722 of the light guide plate 720.

Figure 28:
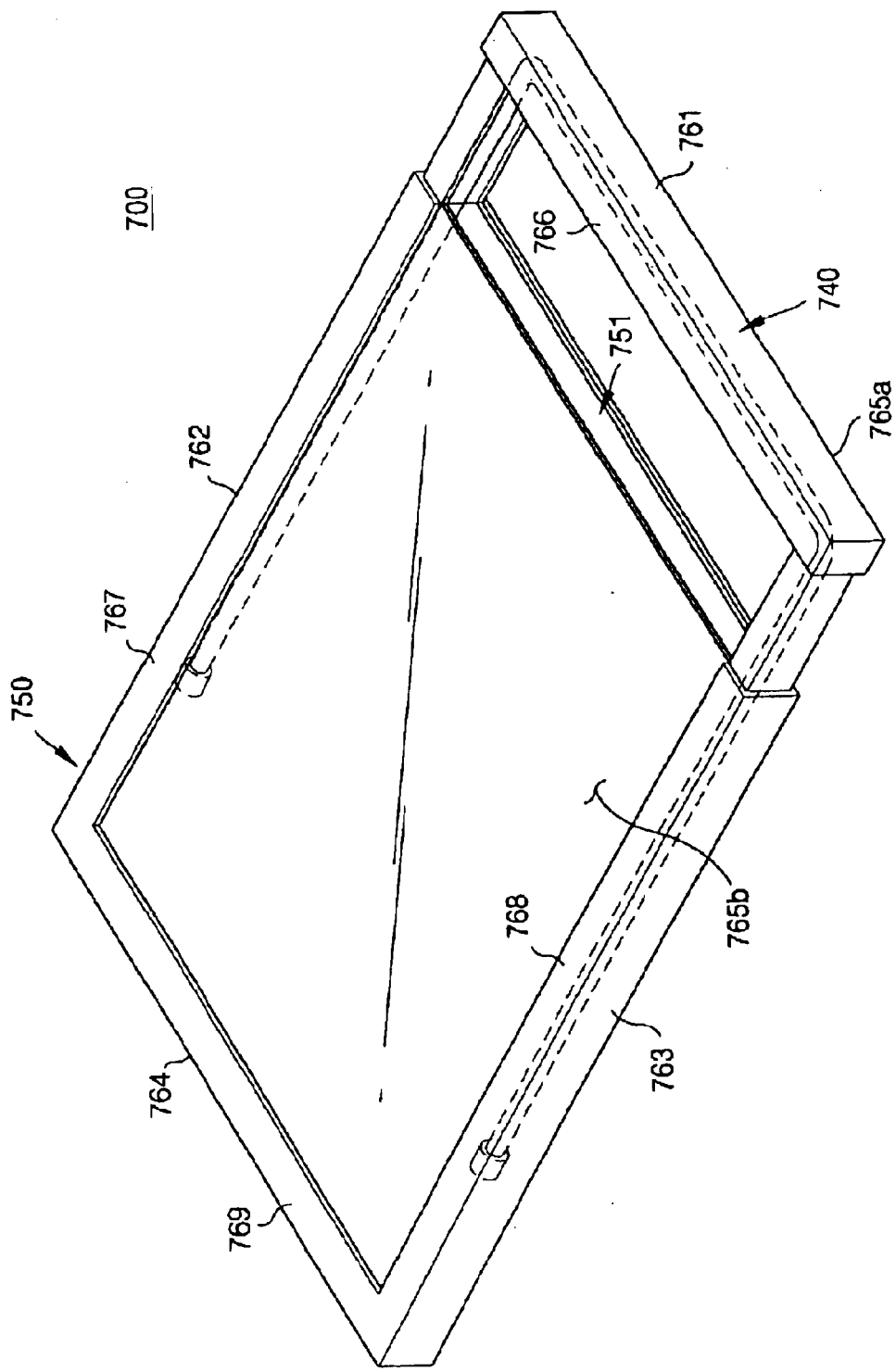
FIG. 28 is a perspective view for explaining a method of separating the lamp unit from the backlight assembly.

FIG. 28 is a perspective view for explaining a method of separating the lamp unit from the backlight assembly.

Referring to FIG. 28, the first sidewall 761 is separated from the second and third sidewalls 762 and 763, the first upper surface 766 connected to the first sidewall 761 is separated from the second and third upper surfaces 767 and 768, and the bottom surface 765 is divided into a first bottom surface 765a and a second bottom surface 765b. The first bottom surface 765a has a size corresponding to that of the first upper surface 766. Hereinafter, a part including the first sidewall 761, first upper surface 766 and first bottom surface 765a of mold frame 760 is referred to as a "first mold frame part 740" and the remaining part of the mold frame 760 is referred to as a "second mold part 750".

When the first mold part 740 is separated from the second mold part 750, the lamp unit 710 is exposed through an opening 751 of the second mold part 750. The lamp unit 710 is withdrawn through the opening 751, so that the lamp unit 710 may be completely separated from the backlight assembly 700.

When the first mold part 740 is separated from the second mold part 750, the U-shaped lamp reflector 713 may be withdrawn from the backlight assembly 700 with the lamp unit 710 because the lamp reflector 713 is fixed to the first mold part 740, for example, by an adhesive.

Accordingly, where the U-shaped lamp 711 is damaged, the U-shaped lamp 711 can be easily replaced without entirely disassembling the backlight assembly 700.

According to the backlight assembly and LCD apparatus, the lamp unit for supplying the light to the light guide unit has the L-shaped lamp, U-shaped lamp or two L-shaped lamps. The mold frame for receiving the lamp unit, light guide unit, one or more optical sheets and reflecting plate is divided into a plurality of parts such that the lamp unit can be easily withdrawn from the LCD apparatus.

Accordingly, the LCD apparatus can obtain an amount of the light enough to display images thereon and uniformly maintain brightness distribution of the light over the light guide unit because of inputting the light through four side surfaces of the light guide unit.

Further, where the lamp is damaged, the lamp can be easily replaced without entirely disassembling the LCD apparatus, thereby increasing throughput of the LCD apparatus.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a first lamp unit configured to generate light, the first lamp unit having a first light generating portion and a second light generating portion integrally connected with the first light generating portion;
a light guide unit configured to guide the light, the light guide unit having side surfaces configured to receive the light, a reflecting surface for configured to reflect the light input through the side surfaces, and an emitting surface configured to emit the light input through the side surfaces and reflected from the reflecting surface; and
a receiving container configured to receive the first lamp unit and the light guide unit, the receiving container having a bottom and sidewalls each extended from the bottom and facing corresponding one of the side surfaces of the light guide unit,
wherein the receiving container is configured to have a plurality of part separable from each other to withdraw the first lamp unit from the receiving container.

2. The backlight assembly of claim 1, wherein the receiving container comprises:
a first part having a first sidewall and a first bottom surface connected to the first sidewall; and a second part having a second sidewall, a third sidewall facing the second sidewall, a fourth sidewall facing the first sidewall, and a second bottom surface connected to the second to fourth sidewalls, wherein the first and second parts are configured to be separable from each other.

3. The backlight assembly of claim 2, wherein the first light generating portion is disposed between the first sidewall of the receiving container and a first side surface of the light guide unit, and the second light generating portion is disposed between the second sidewall of the receiving container and a second side surface of the light guide unit.

4. The backlight assembly of claim 2, wherein the first part includes one of an engaging hole and an engaging protrusion which is disposed at each of one or more end portions of the first part, and the second part includes the other of the engaging hole and the engaging protrusion which is disposed at each of one or more end portions of the second part, the first and second parts being combined to each other by engaging the engaging protrusion into the corresponding engaging hole.

5. The backlight assembly of claim 2, wherein the first lamp unit comprises:
 an L-shaped lamp; and
 a lamp reflector for partially covering the L-shaped lamp to reflect light from the L-shaped lamp to the light guide unit.

6. The backlight assembly of claim 5, wherein the lamp reflector is fixed to the first part.

7. The back light assembly of claim 2, wherein tho first lamp unit comprises:
 a U-shaped lamp having a third light generating portion integrally connected with one end of the first light generating portion and facing the second light generating portion connected with the other end of the first light generating portion; and
 a lamp reflector for partially covering the U-shaped lamp to reflect light from the U-shaped lamp to the light guide unit.

8. The backlight assembly of claim 7, wherein the first light generating portion is disposed between the first sidewall of the receiving container and a first side surface of the light guide unit, the second light generating portion is disposed between the second sidewall of the receiving container and a second side surface of the light guide unit, and the third light generating portion is disposed between the third sidewall of the receiving container and a third side surface of the light guide unit.

9. The backlight assembly of claim 8, wherein the lamp reflector is fixed to the first part and separable from the second part of the receiving container.

10. The backlight assembly of claim 1, further comprising a second lamp unit configured to generate light, the second lamp unit having a third light generating portion and a fourth light generating portion integrally connected with the third light generating portion.

11. The backlight assembly of claim 10, wherein the receiving container comprises:
 a first part having a first sidewall and a first bottom surface connected to the first sidewall;
 a second part having a second sidewall adjacent to the first sidewall, a fourth sidewall connected with the second sidewall and facing the first sidewall, and a second bottom surface connected to the second and fourth sidewalls; and
 a third part having a third sidewall facing the second sidewall and a third bottom surface connected to the third sidewall, wherein the first, second and third parts are configured to be separable from each other.

12. The backlight assembly of claim 11, wherein the first light generating portion is disposed between the first sidewall of the receiving container and a first side surface of the light guide unit, the second light generating portion is disposed between the second sidewall of the receiving container and a second side surface of the light guide unit, the third light generating portion is disposed between the third sidewall of the receiving container and a third side surface of the light guide unit, and the fourth light generating portion is disposed between the fourth sidewall of the receiving container and a fourth side surface of the light guide unit.

13. The backlight assembly of claim 12, wherein the first lamp unit is fixed to the first part and separable from the second and third parts of the receiving container, and the second lamp unit is fixed to the third part and separable from the first and second parts of the receiving container.

14. The backlight assembly or claim 10, wherein the first lamp unit comprises a first L-shaped lamp and a first lamp reflector configured partially to cover the first L-shaped lamp to reflect light from the first L-shaped lamp to the light guide unit, and the second lamp unit comprises a second L-shaped lamp and a second lamp reflector configured partially to cover the second L-shaped lamp to reflect light from the second L-shaped lamp to the light guide unit.

15. The backlight assembly of claim 14, wherein the first lamp reflector comprises a first reflecting surface disposed at one side of the first L-shaped lamp, a second reflecting surface extended from one side edge of the first reflecting surface, and a third reflecting surface configured to reflect the light leaked from the reflecting surface of the light guide unit, the third reflecting surface being extended from the other side edge of the first reflecting surface to a first line between end portions of the first L-shaped lamp, and the second lamp reflector comprises a fourth reflecting surface disposed at one side of the second L-shaped lamp, a fifth reflecting surface extended from one side edge of the fourth reflecting surface and a sixth reflecting surface configured to reflect the light leaked from the reflecting surface of the light guide unit, the sixth reflecting surface being extended from the other side edge of the fourth reflecting surface to a second line between end portions of the second L-shaped lamp.

16. The backlight assembly of claim 15, wherein an end portion of the third reflecting surface extended to the first line comes in contact with an end portion of the sixth reflecting surface extended to the second line.

17. An LCD apparatus comprising:
 a first lamp unit configured to generate light, the first lamp unit having a first light generating portion and a second light generating portion integrally connected with the first light generating portion;
 a light guide unit configured to guide the light, the light guide unit having side surfaces configured to receive the light, a reflecting surface configured to reflect the light input through the side surfaces, and an emitting surface configured to emit the light input through the side surfaces and reflected from the reflecting surface;
 a first receiving container configured to receive the first lamp unit and the light guide unit, the receiving container having a bottom, sidewalls each extended from the bottom and facing corresponding one of the side surfaces of the light guide unit, and upper surfaces each extended from corresponding one of the sidewalls and facing the bottom, wherein the first receiving container is configured to have a plurality of parts separable from each other to withdraw the first lamp unit from the first receiving container;

an LCD panel configured to receive the light from the light guide unit and displaying an image, the LCD panel being disposed on the emitting surface of the light guide unit; and a second receiving container configured to receive a receiving position of the LCD panel, the second receiving container being combined to the first receiving container.

18. The LCD apparatus of claim 17, further comprising a second lamp unit having a third light generating portion and a fourth light generating portion integrally connected with the third light generating portion, the second lamp unit configured to generate light.

19. The LCD apparatus of claim 18, wherein the first receiving container comprises:

a first part having a first sidewall, a first bottom surface connected to the first sidewall, and a first upper surface connected to the first sidewall and facing the first bottom surface;

a second part having a second sidewall adjacent to the first sidewall, a fourth sidewall connected with the second sidewall and facing the first sidewall, a second bottom surface connected to the second and fourth sidewalls, and a second upper surface connected to the second and fourth sidewalls and facing the second bottom surface; and the third part having a third sidewall facing the second sidewall, a third bottom surface connected to the third sidewall, and a third upper surface connected to the third sidewall and facing the third bottom surface, wherein the first, second and third parts are configured to be separable from each other.

20. The LCD apparatus of claim 19, wherein the first light generating portion is disposed between the first sidewall and a first side surface of the light guide unit, the second light generating portion is disposed between the second sidewall and a second side surface of the light guide unit, the third light generating portion is disposed between the third sidewall and a third side surface of the light guide unit, and the fourth light generating portion is disposed between the fourth sidewall and a fourth side surface of the light guide unit.

21. The LCD apparatus of claim 20, wherein the first light generating portion is disposed between the first sidewall and a first side surface of the light guide unit, the second light generating portion is disposed between the second sidewall and a second side surface of the light guide unit, the third light generating portion is disposed between the third sidewall and a third side surface of the light guide unit, and the fourth light generating portion is disposed between the fourth sidewall and a fourth side surface of the light guide unit.

22. The LCD apparatus of claim 20, wherein the second receiving container comprises:

first to third cover surfaces facing the first to third upper surfaces, respectively, of the first receiving container; and first and second sidewall portions extended from the second cover surface to be combined to the second and fourth sidewalls, respectively, of the first receiving container.

23. The LCD apparatus of claim 22, wherein the first and third cover surfaces have a plurality of first engaging holes, and the first and third upper surfaces have a plurality of first engaging protrusions corresponding to the plurality of first engaging holes, respectively.

24. The LCD apparatus of claim 19, further comprising a third receiving container configured to receive the first and second lamp units, the light guide unit and the first receiving container and combining with the second receiving container.

25. The LCD apparatus of claim 24, wherein the third receiving container comprises:

a receiving surface configured to receive the first receiving container;

a third sidewall portion extended from the receiving surface to be combined with the second sidewall of the first receiving container; and a fourth sidewall portion extended from the receiving surface to be combined with the fourth sidewall of the first receiving container.

26. The LCD apparatus of claim 19, further comprising a driving module configured to drive the LCD panel, the driving module being disposed on a non-effective display area of the LCD panel.

27. The LCD apparatus of claim 26, wherein the driving module is disposed on a rear surface of the first receiving container while bending to cover the second or fourth sidewall of the first receiving container.

* * * * *